United States Patent
Lochbihler et al.

(10) Patent No.: US 10,189,295 B2
(45) Date of Patent: Jan. 29, 2019

(54) LAYER ELEMENT

(71) Applicant: GIESECKE & DEVRIENT GMBH, München (DE)

(72) Inventors: Hans Lochbihler, München (DE); André Gregarek, München (DE); Josef Schinabeck, Garmisch-Partenkirchen (DE)

(73) Assignee: GIESECKE + DEVRIENT CURRENCY TECHNOLOGY GMBH, Munich (DE)

( * ) Notice: Subject to any disclaimer, the term of this patent is extended or adjusted under 35 U.S.C. 154(b) by 92 days.

(21) Appl. No.: 15/309,369

(22) PCT Filed: Apr. 16, 2015

(86) PCT No.: PCT/EP2015/000802
§ 371 (c)(1),
(2) Date: Nov. 7, 2016

(87) PCT Pub. No.: WO2015/169422
PCT Pub. Date: Nov. 12, 2015

(65) Prior Publication Data
US 2017/0072734 A1 Mar. 16, 2017

(30) Foreign Application Priority Data

May 6, 2014 (DE) .......................... 10 2014 006527
Oct. 30, 2014 (DE) .......................... 10 2014 016051

(51) Int. Cl.
*B23K 26/352* (2014.01)
*B23K 26/361* (2014.01)
(Continued)

(52) U.S. Cl.
CPC .......... *B42D 25/435* (2014.10); *B23K 26/352* (2015.10); *B23K 26/361* (2015.10);
(Continued)

(58) Field of Classification Search
CPC .. B42D 25/435; B42D 25/373; B42D 25/328; B42D 25/324; B42D 25/29; B23K 26/361; B23K 26/0066; B23K 26/362
(Continued)

(56) References Cited

U.S. PATENT DOCUMENTS 3,980,818 A 9/1976 Browning
4,588,665 A 5/1986 Drexler
(Continued)

FOREIGN PATENT DOCUMENTS

CN 1255895 A 6/2000
CN 1799072 A 7/2006
(Continued)

OTHER PUBLICATIONS

International Search Report for corresponding International PCT Application No. PCT/EP2015/000802, dated Jul. 15, 2015.

*Primary Examiner* — Justin V Lewis
(74) *Attorney, Agent, or Firm* — Workman Nydegger

(57) ABSTRACT

A method for manufacturing a partially demetallized layer element comprises the steps of: supplying a layer element having a carrier substrate with a face that has at least one first and one second region, wherein the first region has a first structure which is different from a second structure of the second region, and at least one metal layer is arranged on the face of the carrier substrate; and removing the metal layer by exciting surface plasmon polaritons by means of electromagnetic radiation in the first region having the first structure. A layer element and an apparatus for carrying out the method are provided.

19 Claims, 16 Drawing Sheets

(51) Int. Cl.
  *B42D 25/435* (2014.01)
  *B42D 25/29* (2014.01)
  *B23K 26/362* (2014.01)
  *B42D 25/324* (2014.01)
  *B42D 25/328* (2014.01)
  *B42D 25/373* (2014.01)

(52) U.S. Cl.
  CPC ............ *B23K 26/362* (2013.01); *B42D 25/29* (2014.10); *B42D 25/324* (2014.10); *B42D 25/328* (2014.10); *B42D 25/373* (2014.10)

(58) Field of Classification Search
  USPC ... 283/67, 70, 72, 74, 75, 82, 83, 85, 94, 98
  See application file for complete search history.

(56) References Cited

U.S. PATENT DOCUMENTS

| | | |
|---|---|---|
| 6,344,261 B1 | 2/2002 | Kaule et al. |
| 7,821,716 B2 | 10/2010 | Staub et al. |
| 2004/0028869 A1 | 2/2004 | Terao et al. |
| 2006/0131425 A1 | 6/2006 | Stenzel et al. |
| 2008/0310025 A1 | 12/2008 | Staub et al. |
| 2012/0015118 A1* | 1/2012 | Zheludev ............ B23K 26/0084 428/29 |
| 2012/0064303 A1 | 3/2012 | Yashiki et al. |
| 2014/0085725 A1 | 3/2014 | Lochbihler et al. |
| 2014/0353959 A1 | 12/2014 | Lochbihler |

FOREIGN PATENT DOCUMENTS

| | | |
|---|---|---|
| CN | 1904951 A | 1/2007 |
| CN | 101315678 A | 12/2008 |
| CN | 103468056 A | 12/2013 |
| EP | 1846253 B1 | 9/2008 |
| EP | 1843901 B1 | 1/2014 |
| GB | 2489745 A | 10/2012 |
| JP | 2005279940 A | 10/2005 |
| WO | 2012156049 A1 | 11/2012 |
| WO | 2013091858 A1 | 6/2013 |

* cited by examiner

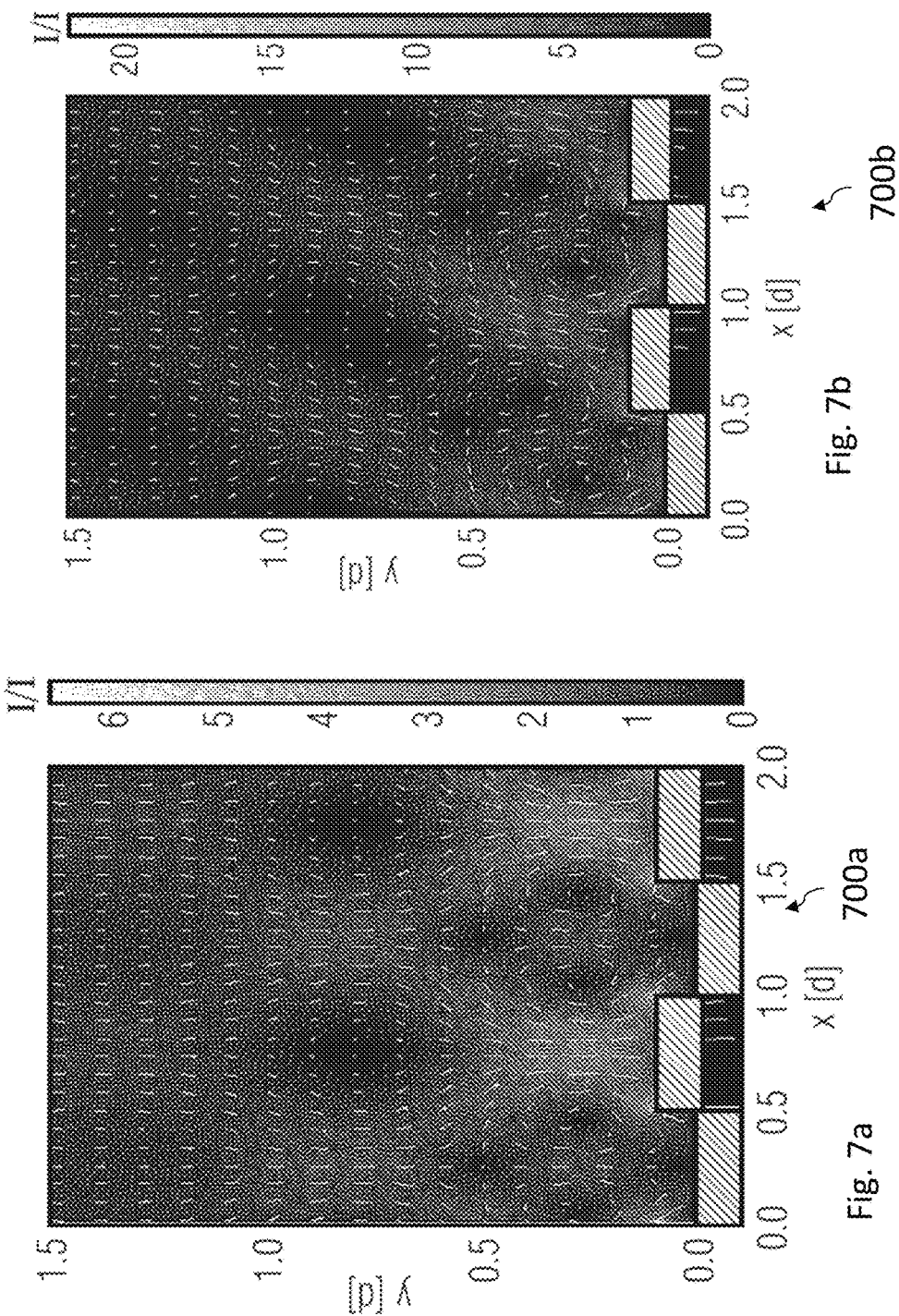

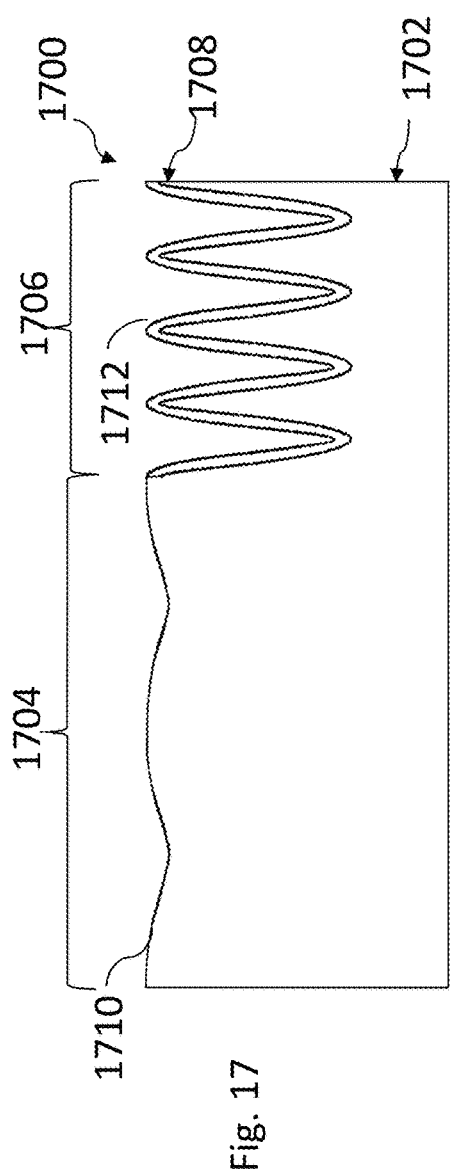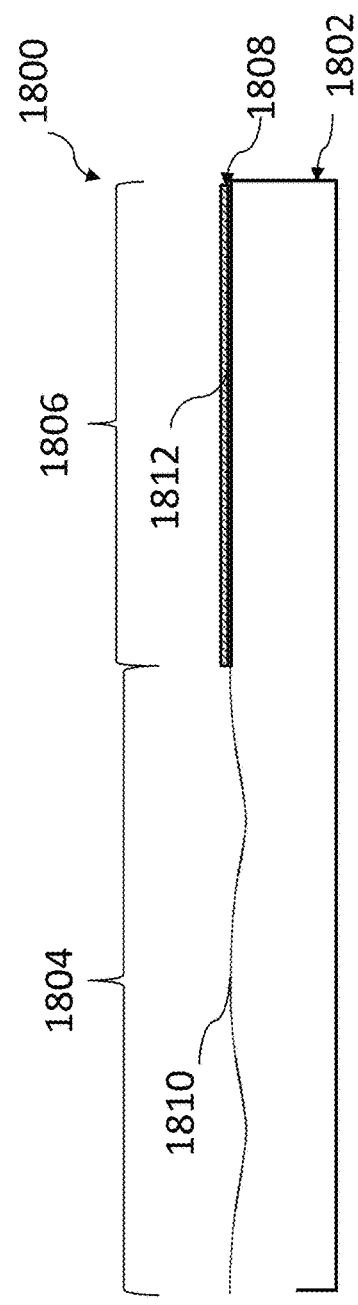

LAYER ELEMENT

BACKGROUND

This invention concerns a method for partially demetallizing a security element, a corresponding security element, a value document having such a security element, and an apparatus for manufacturing such a security element.

Value documents as intended by the invention are, inter alia, bank notes, shares, bonds, deeds, vouchers, checks, air tickets, high-value admission tickets, labels for product authentication, credit cards or cash cards, but also other documents at risk of forgery, such as passports, identification cards or other identity documents.

Value documents, in particular bank notes, are usually produced from paper substrates, polymer substrates or combinations of paper and polymer which have particular security features, such as a security thread at least partly incorporated into the paper, or a watermark. Further security features may be so-called window foils, security threads or security bands that are bonded/laminated to the value document or incorporated therein. Security elements usually comprise a polymer or a polymer composition as a carrier material or base material. Typically, security elements have optically variable security features such as holograms or certain color-shift effects to thereby guarantee better anti-forgery security. The particular advantage of optically variable security elements is that the security features on said security elements cannot be imitated by mere copying using a copying machine, since effects of an optically variable security feature are lost or even only appear black through copying.

In existing value documents with optically variable security elements having for example a plurality of optical effects side by side, it is disadvantageous, however, that with increasing complexity in design their manufacture is very time-consuming and cost-intensive. For example, when manufacturing a security element having, side by side, a hologram and very fine, small-structured transparent or partly demetallized regions (such as negative patterns or negative text) at the same time, the manufacture of the demetallized regions is technically very demanding and, on the other hand, a limitation of the fineness of the demetallized regions is pre-specified or bounded by the employed method for demetallization.

In typical manufacturing methods for a security element having different optical effects, such as a hologram and negative patterns, arranged side by side, the manufacture involves a carrier material first being metallized over the full area, and the regions that are to have the negative patterns being demetallized again in a further method step. Since the structure size of the negative patterns frequently lies in the range of 20 µm to 80 µm, the negative patterns can no longer be incorporated via a mask during the metallization operation, but must be manufactured separately.

To enable such partial demetallizing to be performed especially selectively and accurately, the following procedure is known from the prior art:

A substrate is furnished with a grating having a high aspect ratio, for example 0.4, with the aspect ratio being defined by the ratio of structure depth to structure width. The total substrate and thus also the grating are metal-vapor-coated. The metal layer is distinctly thinner in the region of such gratings compared with a metal layer on smooth regions, on account of the enlarged surface. Hence, the metal can be removed either by laser irradiation or by etching more easily at these places than at the smooth surfaces. Therefore, by means of this procedure the substrate can be partially demetallized in the region of the grating while the other regions—in particular, regions that are flatter than those of the grating—remain metallized. The demetallized grating thus renders a negative pattern which is arranged beside metallized regions. This kind of demetallization therefore necessitates a combination of thinned metal layer and a "light trap," which are both produced by high aspect ratios. Such a method is known for example from EP 1 846 253 or EP 1 843 901. This method is based on the local light absorption, which can be computed by the effective-medium theory.

The requirement to supply optical effects, patterns with ever greater accuracy and finer structuring and complexity results in the situation that finer structures require the embossing and metallizing of ever finer gratings on the substrate. Even now, the requirements for the positional accuracy of patterns and the stroke width of patterns are less than 20 µm in many applications.

Although the embossing and the metallizing of fine gratings are technically mastered, the effort and the risk of defects in the end product increase the finer and deeper the structures become. When such fine gratings are embossed the quality of the cast structure becomes poorer the higher the aspect ratio of the grating is and the finer, smaller the grating structure becomes. Further, in roll-to-roll embossing machines the embossing speed depends on the aspect ratio of the structures to be embossed. Consequently, the manufacturing speed decreases with increasing aspect ratio and fineness of the gratings.

SUMMARY

It is hence the object of the present invention to provide a security element that has a high structure resolution and allows a high complexity in design while simultaneously being manufacturable in a simple manner.

A first aspect of the invention concerns a method for manufacturing a security element with a partially demetallized metal layer of the security element. In particular, this aspect concerns a method for manufacturing a partially demetallized layer element, comprising the steps of:
  supplying a layer element, having
    a carrier substrate with a face having at least one first and one second region,
  wherein
  the first region has a first structure which is different from a second structure of the second region, and
    at least one metal layer arranged on the face of the carrier substrate; and
  removing the metal layer by exciting surface plasmon polaritons by means of electromagnetic radiation in the first region having the first structure.
Preferably, the method comprises the steps of:
  supplying a layer element, having
    a carrier substrate with a face having at least one first region, wherein
  the first region has a first structure, and
    at least one metal layer arranged on the face of the carrier substrate; and
  removing the metal layer by exciting surface plasmon polaritons by means of electromagnetic radiation in the first region having the first structure.

In particular, the face of the carrier substrate is a surface. In particular, the face of the carrier substrate and the metal layer form an interface. In particular, the first region is a first surface region and the second region a second surface region, or a first and second interface region. In particular, the structure is a surface structure or an interface structure. In particular, the first structure and the metal layer form a metallic grating.

Hereinafter the term "surface plasmon polaritons" will be abbreviated as SPPs.

Surface plasmon polaritons (SPPs) are electromagnetic radiation bound to metallic interfaces, which is propagated along its boundary layer and thereby undergoes an absorption. The excitation of SPPs is effected when the conservation of momentum of incident photons and SPPs via multiples of the reciprocal grating vector of a metallic grating is guaranteed. Further, reference is made in particular to FIGS. 1a and 1b, in which the excitation of SPPs is set forth more precisely. The excitation of SPPs is based on the collective resonance absorption via the grating interaction.

The term "layer element" is to be understood in particular to be an element comprising at least a dielectric layer and a metallic layer. However, a layer element can also comprise more than only said two layers. In particular, a layer element can have in different regions different layers, different numbers of layers and/or different orders of layers.

The term "carrier substrate" is to be understood in particular to be a (carrier) layer that is modulatable to incorporate or to form a first structure and/or a second structure into said (modulatable) (carrier) layer. For example, a modulatable (carrier) layer or a carrier substrate can be a PVC or PET foil into which structures are incorporable by means of embossing. Further, a carrier substrate can be for example a PET foil to which an emboss lacquer bearing a structuring is applied. Further, a carrier substrate can be a resin layer or lacquer layer which is modulatable, for example by embossing and/or etching methods. A carrier substrate can likewise be a chip card or an identity card or a base substrate for such a chip card/identity card. Further preferably, the carrier substrate is transparent to the employed electromagnetic radiation.

In particular, a carrier substrate can also have a plurality of faces/interfaces/surfaces which respectively have a modulation with a first and/or a second structure/interface structure/surface structure. Preferably, the carrier substrate is dielectric at least in the first region. Preferably, the carrier substrate has at least one dielectric layer.

In particular, the layer element has a (metallic) grating which is formed by the first structure and the metal layer, said grating having a metal-dielectric interface. Said interface is formed by the metal layer and the dielectric of the carrier substrate. The carrier substrate is a dielectric carrier substrate, at least in the first region.

A differentness of a first structure from a second structure is to be understood in particular to mean that the first and the second structure differ in at least one geometric parameter or structural parameter. For example, the first structure can have a periodic rectangular profile while the second structure is smooth. Further, the first structure/surface structure and the second structure are to be regarded as different when one structure has a rectangular profile with a period of 350 nm and the other structure a rectangular profile with a period of 500 nm.

A metal layer arranged on the face of the carrier substrate is to be understood in particular to be a metallic layer applied on the face of the carrier substrate. The metal layer can be applied to the (sur)face of the carrier substrate for example by vapor deposition, such as physical vapor deposition (PVD).

The metal layer is applied in particular such that the first region/interface region and the second region/interface region of the (sur)face of the carrier substrate are (uniformly) covered with the metal layer.

Preferably, at least one further, dielectric layer can be arranged on the metal layer. Preferably, the metal layer is in this case arranged between the carrier substrate and the further, dielectric layer.

A removing of the metal layer by exciting SPPs by means of electromagnetic radiation in the first region having the first structure is to be understood to mean in particular that the metal layer is removed selectively only in the first region upon full-area irradiation of the layer element, while the metal layer in the second region is not removed, or not removed to the same extent as in the first region, in spite of irradiation.

Preferably, the SPPs are excited by means of the electromagnetic radiation (light) only in the first region and support the removing of the metal layer in said first region. In particular, the (selective) removing of the metal layer in the first region is attained on account of the specific interaction of the electromagnetic radiation incident on the layer element with the first structure which brings about SPPs. Since the second structure is different from the first structure, no SPPs are excited in the second region in a manner that could lead to a removing or complete removing or ablation of the metal layer. Preferably, the term "removing" comprises transforming. Transforming is present for example when the metal layer is transformed to an oxide and/or coagulates to "droplets" by the excitation of SPPs, so that a viewer gains the impression that the metal layer is no longer present or at least translucent, although it is still present in a transformed form. For example, a metal layer of aluminum turns into a layer of aluminum oxide upon a transformation. Upon a removing, further layers connected to the metal layer can also be ablated/removed with the metal layer. Such connected layers can be metal layers and/or dielectric layers. For example, a color-shift buildup having a layer buildup of absorber layer—dielectric—reflective layer or absorber layer—dielectric—absorber layer can be removed. In this case, the metal layer represents for example an absorber layer or the reflective layer of the color-shift buildup. When such a metal layer is removed, the total color-shift buildup will preferably be removed because the connection to the carrier layer is eliminated/removed. Advantageously, negative patterns can in this way be incorporated into a region with a color-shift effect. In particular, a transforming can be present when the metal layer is arranged between at least two layers.

Further preferably, the layer element or the carrier substrate can comprise further regions having structures that differ from the first and the second structure. In particular, the structures of such further regions can be configured such that they likewise support the excitation of SPPs or do not. Should further structures likewise support the excitation of SPPs, the metal layer can likewise be removed in the regions having the further structures by the excitation of SPPs.

It is an advantage that layer elements can be demetallized selectively in first regions by the excitation of SPPs, while other regions are not demetallized. It is in particular advantageous that the first regions can be configured very small and filigree and nevertheless a very selective demetallization is possible, i.e. that only the very small and filigree first regions are demetallized without other regions likewise being demetallized, whereby the first structure provided for this purpose need not have a high aspect ratio. Advantageously, regions, in particular first regions, with a width of smaller than 4 µm can be realized. Likewise, very narrow/ small second regions can be realized on account of the design or the arrangement of first and second regions.

Further preferably, the removing step comprises: irradiating the first and the second region of the layer element with electromagnetic radiation (light), wherein the metal layer is removed only in the first region on account of the first structure by the SPPs excited by the electromagnetic radiation.

In particular, an irradiating of the first and the second region can be effected simultaneously, with the metal layer nevertheless being removed only in the first region. In the same manner, an irradiating of the first region can be effected before or after an irradiating of the second region, with the metal layer nevertheless being removed only in the first region.

The regions of layer elements for security elements can indeed be in a size range of smaller than or equal to 80 μm. Therefore, the processing means, such as laser beam, etching means, etc., frequently cover or process larger areas, e.g. 1 cm², than the dimension of a region. Consequently, in large-scale use a selection of the regions to be processed can no longer be effected solely by the processing means, e.g. by a laser writer, since this would be too time-consuming.

Further, roll-to-roll processes are employed in large-scale use, so that the layer element is guided past the processing means and processed while being guided past. To guarantee a large-area and fast processing, the processing means themselves, such as lasers, are frequently applied non-selectively to the total layer element. That is to say, for example for a demetallization by means of laser radiation, a large (sur)face or even the total (sur)face of a layer element is irradiated, even when only comparatively small regions are to be demetallized.

It is hence advantageous that the arrangement of the different structures, namely, the first and the second structure, achieves a selective interaction of the processing means with the respective structure even when the processing means itself is applied non-selectively. In this connection, it is especially advantageous that for demetallizing regions by means of the excitation of SPPs the structure of the layer element is also much easier to manufacture, since no high aspect ratios are required to attain a selection by means of an interaction of structure and processing means.

Preferably, the step of supplying a carrier substrate comprises the step of: forming the first structure in the first region of the carrier substrate.

The term "forming" can be understood to mean in particular that the first structure and/or the second structure is incorporated. Such an incorporating can be effected for example by means of embossing.

Further preferably, the carrier substrate has dielectric material. Preferably, the carrier substrate has an emboss layer. Advantageously, the emboss layer contains or comprises the first structure. Additionally or alternatively, the emboss layer comprises the second structure.

Preferably, the step of supplying a carrier substrate comprises the step of: arranging a metal layer on the face of the carrier substrate.

The phrase "arranging a metal layer on the face of the carrier substrate" can be understood to mean for example applying or depositing a metal layer. This can be effected by means of physical vapor deposition, such as thermal evaporation, electron beam vapor deposition or sputtering.

Further preferably, the metal layer has a layer thickness of 10 nm to 200 nm.

Further preferably, the metal layer has a layer thickness of 20 nm to 100 nm. In particular, the layer thickness in the first region has a layer thickness of 30 nm to 60 nm, of 50 nm to 70 nm and/or of 60 nm to 80 nm. Particularly preferably, the metal layer has a layer thickness between 30 nm and 80 nm.

Further preferably, the metal layer comprises, as a material, aluminum (Al) and/or silver (Ag) and/or copper (Cu) and/or chromium (Cr). In particular, the metal layer can be based on an alloy which has one or more of the above-mentioned materials.

Advantageously, the first structure has an aspect ratio of smaller than 0.3.

Further preferably, the first structure has an aspect ratio of smaller than 0.2. Particularly preferably, the first structure has an aspect ratio between 0.05 and 0.2. Further preferably, the first structure has an aspect ratio between 0.05 and 0.1 or between 0.1 and 0.2. An aspect ratio is to be understood in particular to be the ratio of structure depth to structure width. For example, the structure depth of a triangular interface structure is to be understood to be the distance or the difference in level from a vertex to the nearest triangle trench. Structure width is to be understood to be the distance from vertex to the nearest vertex. With periodic structures having a symmetric profile, structure width is to be understood to be half a period, while structure depth is the peak-to-valley distance.

Further preferably, the first structure is a relief structure.

Advantageously, the first structure is simpler and faster to manufacture, on account of the low aspect ratio, namely, smaller than 0.3, than a structure with an aspect ratio of greater than 0.3. In particular, first structures with the aspect ratio of smaller than 0.3 can be manufactured faster and more simply by a roll-to-roll embossing method. The form fidelity, i.e. the adherence to the stipulated structure, is also better possible. It is a great advantage that the first structure with an aspect ratio of smaller than 0.3 can nevertheless be demetallized.

Preferably, the first structure has a one-dimensionally periodic structure, in particular a periodic structure of a diffraction grating. The grating profile of the diffraction grating can have an arbitrary geometry. Preferably, the grating profile has no undercuts, i.e. no overhanging regions.

For example, a wavy pattern would conform to a one-dimensionally periodic structure. Such a wavy pattern can be for example sinusoidal. In this case, the periodic structure has in one (spatial) direction a profile conforming to a sine function, while in a (spatial) direction orthogonal thereto the profile conforms to a straight line which corresponds to the respective level line. In other words, a one-dimensionally periodic structure is comparable to a (bar) grating.

The first structure can further preferably have a two-dimensionally periodic structure. A two-dimensionally periodic structure is described for example in WO 2012/156049 A1. Alternatively, sinusoidal cross gratings can be employed.

In particular, the periods in the respective (spatial) direction in a two-dimensionally periodic structure can be mutually different.

In this connection, the term "periodic" is to be understood such that deviations from a (perfect, ideal) periodic structure can be present due to manufacturing methods.

Further preferably, the first structure has a periodic structure with at least one period in the range of 350 nm to 2 μm.

Particularly preferably, the first structure has a periodic structure with at least one period in the range of 360-750 nm or 751-1300 nm. Further preferably, a period lies in the range of 350 nm to 560 nm, 550 nm to 750 nm, 751 nm to 960 nm, 950 nm to 1160 nm and/or 1150 nm to 1300 nm.

Preferably, the first structure has a grating structure as a periodic structure with a period of 360 nm to 1300 nm.

Further preferably, the first structure has a periodic structure with a period number of more than 3, more than 4, more than 5, or more than 6 periods.

Further preferably, the first structure has as a periodic structure substantially a rectangular or sinusoidal profile. In particular, the phrase "substantially a rectangular profile" or "substantially a sinusoidal profile" is to be understood to mean that the rectangular or sinusoidal profile can have deviations from a (perfect, ideal) rectangular or sinusoidal form due to the manufacturing methods thereof.

Preferably, the geometric parameters or profile parameters of the first structure and the metal coating at the interface are so chosen that surface plasmon polaritons are excited for a pre-specified wavelength and predetermined angle of incidence at TM polarization.

Preferably, the second structure of the at least one second region has a relief structure. Alternatively, the second structure has a relief-free structure. A relief-free structure is in particular a non-modulated face or smooth face.

Further preferably, the second structure has a diffractive structure as a relief structure. A diffractive structure can be for example a hologram, a zero-order device, a moth-eye structure or a microcavity structure. Microcavities are described for example in WO 2013/091858.

Further preferably, the second structure has a refractive structure as a relief structure. A refractive structure can be for example a micromirror arrangement or a microlens arrangement.

Further preferably, the method comprises: stipulating/computing the geometric parameters of the first structure on the basis of a pre-specified electromagnetic radiation or laser radiation with the wavelength $\lambda$ (wavelengths $\lambda$), (at least) a pre-specified angle of incidence $\Theta_0$, and the formula $k_{SP} = k_{Photon} \sin \Theta_0 \pm n_V G$, with $G = 2\pi/d$, where
$k_{SP}$ is the wave vector of the surface plasmon polaritons,
$k_{Photon}$ is the wave vector of the photon incident on the metal layer,
$\Theta_0$ is the angle of incidence of the electromagnetic radiation impinging on the metal layer,
$n_V$ is an integral multiple,
G is the reciprocal grating vector, and
d is the period of the first structure.

Further, it holds that $k_{SP} > k_{Photon}$ with $k_{Photon} = 2\pi/\lambda$. In particular, the integral multiple $n_V$ can be regarded as the coupling strength.

In other words, the first structure can be stipulated or determined on the basis of an electromagnetic radiation of a pre-specified wavelength $\lambda$ and a pre-specified angle of incidence $\Theta_0$. In particular, the first structure can be stipulated with additional consideration of a required coupling strength $n_V$. The first structure is preferably a periodic grating with the reciprocal grating vector G.

The coupling strength $n_V$ depends in particular on the geometry of the first structure/the grating cross section of the first structure and the optical material parameters. The optical material parameters are in particular the optical material parameters of the metal layer or additionally of the carrier substrate/dielectric and/or of further layers. In particular, the coupling strength $n_V$ is computed by the rigorous solution of Maxwell equations.

Preferably, the method comprises one or more of the steps of:
stipulating/pre-specifying a carrier substrate or a refractive index of the carrier substrate; and/or
stipulating/pre-specifying optical material parameter of the metal layer; and/or selecting a metal/metal alloy or material for the metal layer;
stipulating/pre-specifying the optical material parameters of the carrier substrate; and/or stipulating/pre-specifying the wavelength or wavelengths $\lambda$ of the electromagnetic radiation; and/or
stipulating/pre-specifying the angle of incidence $\Theta_0$ at which the electromagnetic radiation impinges on the metal layer; and/or
stipulating the coupling strength $n_V$.

Preferably, one or more of the above steps can be a substep of the method step of "stipulating the geometric parameters of the first structure . . . ".

Further preferably, the method comprises: irradiating the metal layer with electromagnetic radiation, there existing between the wavelength or wavelengths $\lambda$ and the period d of the first structure the following relation $\lambda \approx d*n$, where n is the refractive index of the carrier substrate or dielectric at the interface to the metal layer.

Further preferably, the method comprises: irradiating the metal layer with electromagnetic radiation from a wavelength range of 400 nm to 2000 nm.

Preferably, the electromagnetic radiation lies in a wavelength range of 350 nm to 650 nm, 651 nm to 950 nm, 951 nm to 1250 nm, 1251 nm to 1550 nm, 1551 nm to 1850 nm or 1851 nm to 2000 nm. Particularly preferably, the electromagnetic radiation lies in a wavelength range of 1000 nm to 1100 nm or of 500 nm to 550 nm. Further preferably, the electromagnetic radiation lies in a wavelength range between 2000 nm and 3000 nm and/or the double-frequency thereof and/or the triple-frequency thereof.

Further preferably, the method comprises: irradiating the metal layer with a beam of electromagnetic radiation which impinges on the metal layer at an angle of incidence/incidence between 0° to 10° based on a normal/perpendicular to the plane spanned by the first structure. Preferably, the angle of incidence lies between 0.5° and 5°, particularly preferably between 0.5° and 3°.

Further preferably, the method comprises: irradiating the metal layer with a beam of electromagnetic radiation, having a beam divergence with a divergence angle of smaller than 10°.

Preferably, the beam of the electromagnetic radiation has a beam divergence with a divergence angle of smaller than 10° in a direction normal/perpendicular to the plane of incidence or plane of irradiation.

In particular preferably, the beam of the electromagnetic radiation has a beam divergence with a divergence angle of smaller than 5°, further preferably smaller than 3°, particularly preferably smaller than 0.5°, in the direction of (parallel to) the plane of incidence or plane of irradiation.

Further preferably, the method comprises: irradiating the metal layer by means of pulsed electromagnetic radiation, with the pulsed electromagnetic radiation preferably having a pulse length of 1 ns to 500 ns, preferably 5 ns to 200 ns, particularly preferably 10 ns to 100 ns, preferably 20 ns to 60 ns, further preferably 35 ns to 45 ns or 40 ns.

Advantageously, an irradiation by means of pulsed electromagnetic radiation promotes a heat input taking place in the first region through the excitation of SPPs. However, said heat input is not dissipated via heat conduction or heat radiation, but leads to a removing/ablation of the metal.

Further preferably, the method comprises: polarizing the beam of the electromagnetic radiation, so that the metal layer is irradiated with TM-polarized radiation.

With a TM-polarized (transverse-magnetic) wave, the electrical field vector oscillates parallel to the plane of incidence. TM-polarized radiation can excite SPPs at an interface between a metal and a dielectric. In particular, such an excitation can take place at a metal layer/dielectric interface of a metallic grating. Advantageously, the (dielectric) carrier substrate forms with the first structure and the metal layer such a dielectric/metal boundary layer of a metallic grating. Said excitation of SPPs leads to the absorption of a high share of the incident light and turns into heat. Upon employment of short laser pulses as a beam source, the heat input can become so high that the metal layer is removed from the first structure. In other words, the metallic grating interface is removed, i.e. the metal of the metallic grating. Upon an employment of unpolarized radiation, the share of the resonant light absorption is reduced, since unpolarized radiation only contains a share of TM-polarized radiation. Said reduced share reduces the optical contrast between the regions in which resonant light absorption takes place and the regions in which no SPPs are excited.

Further preferably, the method comprises: irradiating the metal layer with laser radiation.

Further preferably, the method comprises: irradiating the metal layer with laser radiation as electromagnetic radiation with a top-hat-shaped beam cross section.

Further preferably, the method comprises: focusing the beam of electromagnetic radiation, so that the electromagnetic radiation is present so as to be focused in a focal plane that lies parallel to the plane spanned by the first structure.

In other words, the electromagnetic radiation is to impinge in a focused manner on the metal layer or on the first structure in order to attain an excitation of SPPs. That is to say, the electromagnetic radiation preferably impinges in a focused manner on the interface of the metal layer and the first structure. Since the same irradiation conditions or incidence conditions are to be fulfilled in every region of the layer element, a focusing of the electromagnetic radiation on a focal plane is advantageous.

Further preferably, the method comprises: deflecting the beam of electromagnetic radiation in order to guide the electromagnetic radiation over a region that is greater than the beam cross section, so that an irradiation by means of electromagnetic radiation can be effected at every point of a region to be irradiated.

Further preferably, the method comprises: transporting the layer element by means of a transport device, so that the layer element is guided into an irradiation zone, and guided out of the irradiation zone after the removing step.

Preferably, the layer element is guided through the irradiation zone at unvarying speed.

Further preferably, the method comprises that the layer element is irradiated such that the laser radiation (first) impinges on an interface of metal layer and air. Alternatively or additionally, the method comprises that the layer element is irradiated such that the laser radiation impinges on an interface of metal layer and a dielectric layer. In particular, the dielectric layer can be the carrier substrate or at least the first region of the carrier substrate. Further, the dielectric layer can be a layer that is arranged on that face of the metal layer that opposes the carrier substrate.

Further preferably, the method comprises that the layer element is irradiated such that the laser radiation first impinges on the carrier substrate before impinging on the metal layer, or the laser radiation first impinges on the metal layer.

In other words, the irradiating of the metal layer can take place "directly" or "indirectly". For example, a direct irradiation of the metal layer is present when the metal layer is the first layer-element layer that is irradiated. In contrast, an indirect irradiation of the metal layer is present when other layers of the layer element are irradiated first before the electromagnetic radiation impinges on the metal layer. This case is present for example when the electromagnetic radiation first penetrates the carrier substrate and then impinges on the metal layer. Advantageously, this is a preferred variant of irradiation, since it involves a greater tolerance with respect to the required angle of incidence of the incident light on the layer element or the metal layer.

A further aspect concerns a layer element for partially demetallizing a metal layer of the layer element. In particular, said aspect concerns a layer element comprising
  a carrier substrate with a face having at least one first and one second region,
  wherein the first region has a first structure which is different from a second structure of the second region,
  the first structure has an aspect ratio of smaller than 0.3, and
  at least one metal layer arranged on the face of the carrier substrate,
  wherein the metal layer is removable/has been removed from the face of the carrier substrate in the first region with the first structure by excitation of surface plasmon polaritons by means of electromagnetic radiation.

Preferably, the layer element comprises
  a carrier substrate with a face having at least one first region,
  wherein the first region has a first structure,
  the first structure has an aspect ratio of smaller than 0.3, and
  a metal layer arranged on the face of the carrier substrate,
  wherein the metal layer is removable/has been removed from the face of the carrier substrate in the first region with the first structure by excitation of SPPs by means of electromagnetic radiation.

The first structure is a stipulated or pre-specified structure, in particular a surface structure or interface structure. The second structure is likewise a stipulated structure, in particular a surface structure or interface structure which, however, is different from the first structure.

Further preferably, the first structure has an aspect ratio of smaller than 0.2, still further preferably smaller than 0.1. Further preferably, the first structure has an aspect ratio between 0.01 and 0.3. Still further preferably, the first structure has an aspect ratio between 0.02 and smaller than 0.3. Particularly preferably, the first structure has an aspect ratio of 0.01 to 0.2 or of 0.01 to 0.1 or of 0.02 to 0.1.

Further preferably, the metal layer is not removable in the second region by the excitation of SPPs that contribute or lead to the removing of the metal layer in the first region on account of the first structure.

Preferably, no SPPs that lead to the removing of the metal layer in the second region are excitable in the second region on account of the differentness of the second structure from the first structure, when SPPs that lead to the removing of the metal layer in the first region are excited in the first region.

Further preferably, the first structure has a relief structure with a one-dimensionally periodic structure or a two-dimensionally periodic structure.

Further preferably, the first structure has a periodic structure with a period in the range of 350 nm to 2 μm.

Further preferably, the first structure has a periodic structure with a period number of more than 3, more than 4, more than 5 or more than 6 periods.

Further preferably, the first structure has substantially a rectangular or sinusoidal profile as a periodic structure.

Further preferably, the second structure of the at least one second region has a relief structure which is different from the first structure, or a relief-free structure. Further preferably, the second structure has diffractive or refractive structures as a relief structure, in particular moth-eyes, microcavities, holograms, micromirrors or microlenses.

Further preferably, the carrier substrate has dielectric material. Preferably, the carrier substrate has an emboss layer having the first or the second structure.

Preferably, the metal layer has a layer thickness of 10 nm to 200 nm. Further preferably, the metal layer has a layer thickness of 20 nm to 80 nm. In particular, the layer thickness has in the first region a layer thickness of 30 nm to 60 nm and/or 50 nm to 70 nm or 60 nm to 80 nm. Particularly preferably, the metal layer has a layer thickness of 30 nm to 80 nm.

Further preferably, the metal layer has at least one of the materials Al, Ag, Cu or Cr. Further, one or more further layers are arranged on the metal layer, such as metal layers or dielectric layers. For example, the metal layer can be a layer of a color-shift buildup. Further, the metal layer can be an alloy.

In particular, the layer element has one or more features as were explained for the first aspect. Preferably, the layer element comprises one or more features that result from implementing one or more of the method steps explained for the first aspect. Accordingly, the explained implementations and configurations for the layer element with regard to its manufacture apply analogously to the structure of the layer element.

A further aspect concerns a security element based on a layer element as described for the preceding aspects, wherein the layer element has at least one first and one second region and a metal layer arranged partially on the face of the carrier substrate, wherein the metal layer has been removed from the face of the carrier substrate in the first region with the first structure on account of the first structure of the first region and by excitation of surface plasmon polaritons.

A security element according to this invention can contain in particular a foil or a multilayer substrate, wherein the multilayer substrate can also have a combination of fabric substrates and foils. The security element can have for example a window region which serves for filling a hole in a value document or in the paper substrate of the value document.

The security element can be connected to the value-document substrate for example by means of bonded connections. Alternatively or additionally, the security element can be embedded into the value-document substrate by papermaking, e.g. as a security thread.

A further aspect concerns a value document, in particular bank note, comprising a value-document substrate and at least one security element connected to the value-document substrate and having one or more features as explained for the preceding aspects.

A further aspect concerns an apparatus for partially demetallizing a layer element, comprising:

a laser device for irradiating a layer element with laser radiation in an irradiation zone; and a transport device for transporting the layer element, wherein the layer element comprises
a carrier substrate with a face having at least one first and one second region, wherein the first region has a first structure which is different from a second structure of the second region, and
at least one metal layer arranged on the face of the carrier substrate; and
wherein the laser device is designed to excite, in the irradiation zone, surface plasmon polaritons on the metal layer of the layer element, so that the metal layer is removed in the first region having the first structure.

Preferably, the apparatus comprises
a laser device for irradiating a layer element with laser radiation in an irradiation zone; and
a transport device for transporting the layer element, wherein the layer element comprises
a carrier substrate with a face having at least one first region, wherein
the first region has a first structure, and
at least one metal layer arranged on the face of the carrier substrate; and
wherein the laser device is designed to excite, in the irradiation zone, surface plasmon polaritons on the metal layer of the layer element, so that the metal layer is removed in the first region having the first structure.

The laser device is in particular designed to excite, in the irradiation zone, surface plasmon polaritons on the metal layer of the layer element in dependence on the stipulated geometric parameters of the first structure. In particular, the laser device is settable/adjustable in order to supply an irradiation in the irradiation zone that is tuned to the stipulated geometric parameters of a layer element, so that surface plasmon polaritons can be excited on the metal layer of the layer element, so that the metal layer is removed in the first region having the first structure.

Preferably, the laser device comprises a beam guiding device for guiding the laser radiation, which is designed to guide the laser radiation such that an irradiation of the metal layer of the layer element is effected at an angle of incidence that is tilted with regard to the normal to the plane spanned by the first structure within the plane of incidence between 0° and 10°, preferably between 1° and 5°, between 0° and 3.5° or between 0° and 2°.

The optimal angle of incidence is stipulated/pre-specified by the geometric parameters of the first structure (grating parameters) in the first region and the employed laser wavelength. Preferably, no conical beam arrangement is present (classical grating diffraction). However, no narrow tolerances are required with respect to a tilting out of the plane of incidence.

Preferably, the beam guiding device is designed to guide the laser radiation over a region in the irradiation zone that is greater than the beam cross section of the laser radiation, so that an irradiation by means of laser radiation can be effected at every point of a region to be irradiated.

Preferably, the beam guiding device is designed to guide the laser radiation over the region to be irradiated such that the laser radiation is incident at every point of the region to be irradiated at the same pre-specified angle(s) of irradiation/incidence for exciting SPPs.

Preferably, so-called roll-to-roll processes are applied in the large-scale manufacture of layer elements. This means that a plurality of layer elements are typically arranged side by side and wound on a roll. For processing, said roll is typically unwound continuously and the layer elements thus guided past the respective processing zone, e.g. irradiation zone, both successively and side by side. Accordingly, in a processing zone a plurality of layer elements are processed over a wide region partly simultaneously, partly successively. Hence, it is advantageous when at every point of a region to be irradiated the same incidence conditions are present, e.g. the pre-specified angles of incidence are adhered to.

Preferably, the beam guiding device is designed to adapt the focal position to a focal plane that lies parallel to the plane spanned by the first structure.

Preferably, the beam guiding device has an F-Theta objective and/or a 3D scanner and/or a telecentric F-Theta objective and/or a polygonal wheel and/or acousto-optical modulators in order to adapt the focal position and/or supply a pre-specified angle of incidence. Further preferably, the beam guiding device has a line optic. The laser beam then has the form of a narrow line having the width of the processing region. Advantageously, the laser beam then no longer needs to be deflected. For example, a laser device can have laser radiation with a power of 300 watts at a frequency of 6 kHz, with the laser radiation having the form of a line with the dimensions 0.3 mm (length)×140 mm (width). For example, a layer element with a width of 140 mm could thus be processed by such a laser device at a web speed of 100 m/min.

Preferably, the laser device comprises a polarizer in order to supply TM-polarized laser radiation. Preferably, the laser radiation impinging on the metal layer has a beam divergence with a divergence angle of smaller than 10° in a direction normal/perpendicular to the plane of incidence.

Preferably, the laser radiation impinging on the metal layer has a beam divergence with a divergence angle of smaller than 5°, further preferably smaller than 3°, in the direction of the plane of incidence. Particularly preferably, the beam divergence has a divergence angle of smaller than 1°, still further preferably of 0.5°, in the direction of (parallel to) the plane of incidence.

Preferably, the beam cross section of the laser radiation is top-hat-shaped. Preferably, the laser device emits pulsed laser radiation, with the pulsed laser radiation preferably having a pulse length of 1 ns to 500 ns, preferably 5 ns to 200 ns, particularly preferably 10 ns to 100 ns. Further preferably, the pulse length has a length of 20 ns to 60 ns, 35 ns to 45 ns or 40 ns.

Further preferably, the method comprises that the layer element is irradiated such that the laser radiation first impinges on the carrier substrate before impinging on the metal layer, or the laser radiation first impinges on the metal layer.

Preferably, the apparatus is designed to irradiate the layer element such that the laser radiation (first) impinges on an interface of metal layer and air or impinges on an interface of metal layer and a dielectric layer. The dielectric layer can be the carrier substrate or a further dielectric layer.

Preferably, the transport device is designed to guide the layer element into the irradiation zone, and to guide it out of the irradiation zone after the metal layer of the layer element was removed by excitation of SPPs in the first region having a first structure.

Preferably, the laser device is designed to irradiate the first and the second region of the layer element with laser radiation successively and/or simultaneously, wherein the metal layer is removed only in the first region having the first structure by the SPPs excited with laser radiation.

Preferably, the laser device emits laser radiation from a wavelength range of 400 nm to 2000 nm, preferably 500 nm to 550 nm, or 1000 nm to 1100 nm, further preferably 532 nm and/or 1064 nm. Further preferably, the laser radiation lies in a wavelength range of 2000 to 3000 nm and/or the double-frequency thereof and/or the triple-frequency thereof.

Preferably, the wavelength(s) $\lambda$ of the laser radiation correspond approximately to the product of period d and refractive index n of the carrier substrate at the interface to the metal layer in the first region.

In particular, the apparatus has one or more devices or features to enable implementation of the method as it was explained for the first aspect. Accordingly, the explained implementations and configurations relating to the method and to the layer element with regard to its manufacture apply analogously to the configuration of the apparatus required therefor.

BRIEF DESCRIPTION OF THE DRAWINGS

The invention will be explained hereinafter on the basis of preferred embodiments in connection with the attached figures, whose representation does without a true-to-proportion and true-to-scale rendition in order to increase the illustrative value.

There are shown:

FIG. 4 a diagram with absorption as a function of angle of incidence for different layer thicknesses and at TM-polarized irradiation for a layer element according to FIG. 3a;

FIG. 5a, b simulations of the electromagnetic near-fields upon excitation of SPPs for a layer element according to FIG. 3a;

FIG. 7a, b simulations of the electromagnetic near-fields upon excitation of SPPs for a layer element according to FIG. 3b;

FIGS. 11a-c diagrams relating to absorptance as a function of angle of incidence at TM-polarized irradiation with a wavelength of $\lambda=532$ nm according to FIG. 3a;

FIG. 17 a schematic sectional view of a layer element;

FIG. 18 a schematic sectional view of a further layer element; and

DETAILED DESCRIPTION OF VARIOUS EMBODIMENTS

Figure 1A:
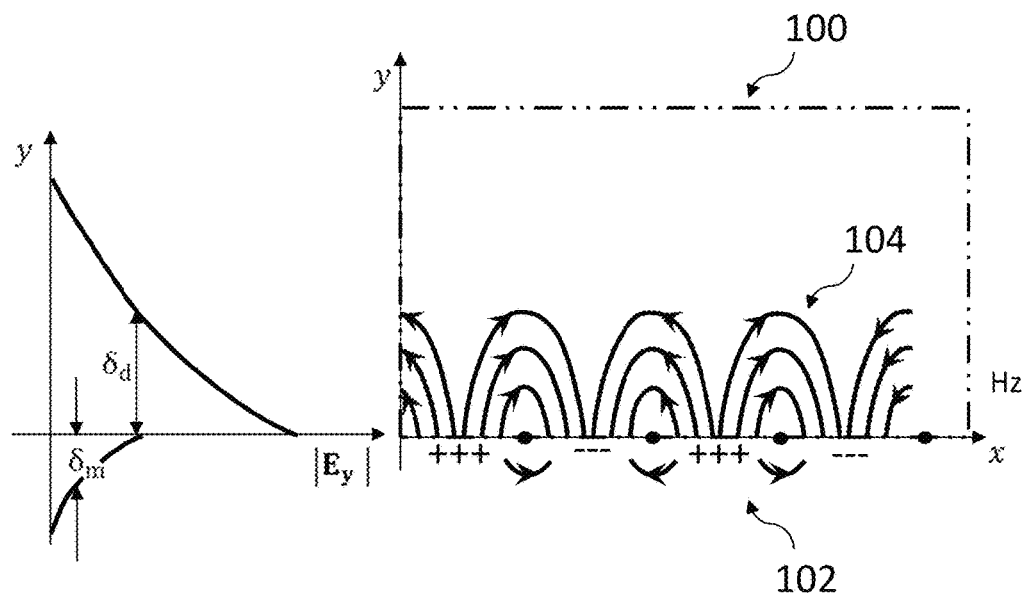
FIG. 1a a schematic representation for the exciting of surface plasmon polaritons.

SPPs arise from an interaction of electromagnetic radiation or light on metal surfaces. In particular, SPPs can occur on smooth metal surfaces, but also rough metallized faces, in particular on metallic relief structures. SPPs are electromagnetic radiation/light bound to the metal surface/metal face, which is propagated along the metal face and absorbed as a result of the damping constant k of the metal. The complex refractive index of the metal is defined here by $v_M = n + i^*k$. The electromagnetic field strength is substantially higher here at the surface or interface of metal layer and dielectric than upon the free propagation of light. This field concentration can be orders of magnitude higher than upon the free propagation of light. The electromagnetic field strength drops perpendicular to the metal surface exponentially with the penetration depths $\delta_M$ and $\delta_d$, as is represented schematically for example in FIG. 1a. In particular, FIG. 1a schematically shows a dielectric carrier substrate 100 which is to be located in the region y>0 of the coordinate system, as well as a metal layer 102 which is to be located in the region y<0 of the coordinate system. The marked E-field lines bear the reference sign 104.

The excitation of surface plasmon polaritons is effected over the share of the electromagnetic radiation that is TM-polarized. For only a component of the E-field that is oriented perpendicular to the metal surface can excite the electron gas in the metal to oscillate. The range of surface plasmon polaritons is in the order of magnitude of 10 μm to 100 μm and depends primarily on the conductivity of the metal.

Figure 1B:
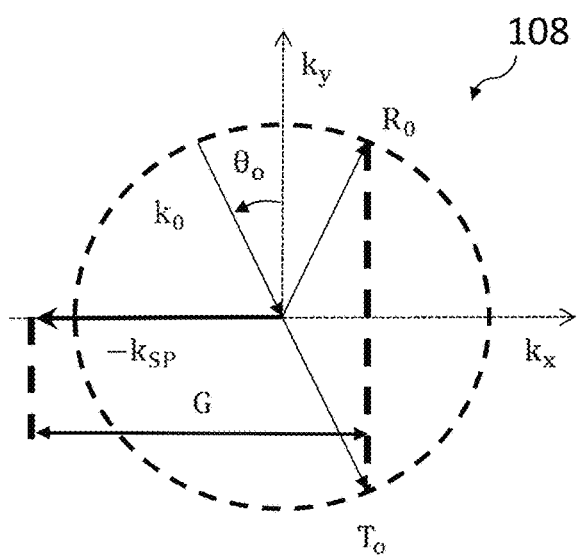
FIG. 1b a schematic representation for the light interaction in k-space.

Further, upon this interaction not only the conservation of energy must be fulfilled but also the law of conservation of momentum. FIG. 1b illustrates this relation in a so-called k-space diagram 108, which reflects the pulse space. On account of the dispersion of the SPPs it holds that $k_{SP} > k_{Photon}$, where $k_{SP}$ is the wave vector of the SPPs and $k_{Photon}$ the wave vector of the photon incident on the metal layer. Hence, the pulse adaptation is favorably effected through the interaction with a periodic structure/metallic grating and the appurtenant reciprocal structure vector $G = 2\pi/d$, where d is the (grating) period. Ultimately, there results the formula $k_{SP} = k_{Photon} \sin \Theta_0 \pm n_v G$, where $n_v$ is an integral multiple and is interpreted/designated as the coupling order or coupling strength. This relation means that SPPs are excited on account of electromagnetic radiation of a certain wavelength and of a pre-specified angle of incidence. However, the coupling strength depends not only on the geometry of the grating cross section/periodic structure but also on the optical material parameters, and can be computed only by the rigorous solution of Maxwell equations. Flat (surface) structures or interface structures are suited especially well for exciting SPPs. Upon the excitation of SPPs on flat (surface) structures, e.g. periodic relief structures with an aspect ratio of smaller than 0.3, the incident electromagnetic radiation can be completely absorbed, i.e. the reflectance of an otherwise reflecting metal drops to zero.

For example, a (periodic) structure can have a profile whose structure depth/profile depth amounts to only a 2/100th of the period of the structure. Therefore, upon illumination with light in the visible region—i.e. without SPPs being excited—the metallized (surface) structure would appear to a viewer approximately like a smooth mirror. Only through excitation of surface plasmon polaritons is an absorption of incident light attained.

For general information about SPPs, reference is made by way of example to the following literature sources:

H. Raether, "Surface Plasmons on Gratings: Surface Plasmons on Smooth and Rough Surfaces", Springer (1988);

Hutley, M. C., and D. Maystre, "The total absorption of light by a diffraction grating," Opt. Commun. 19, 431-436 (1976), and H. Lochbihler, Phys. Rev. B 53, 10289 (1996).

Figure 2:
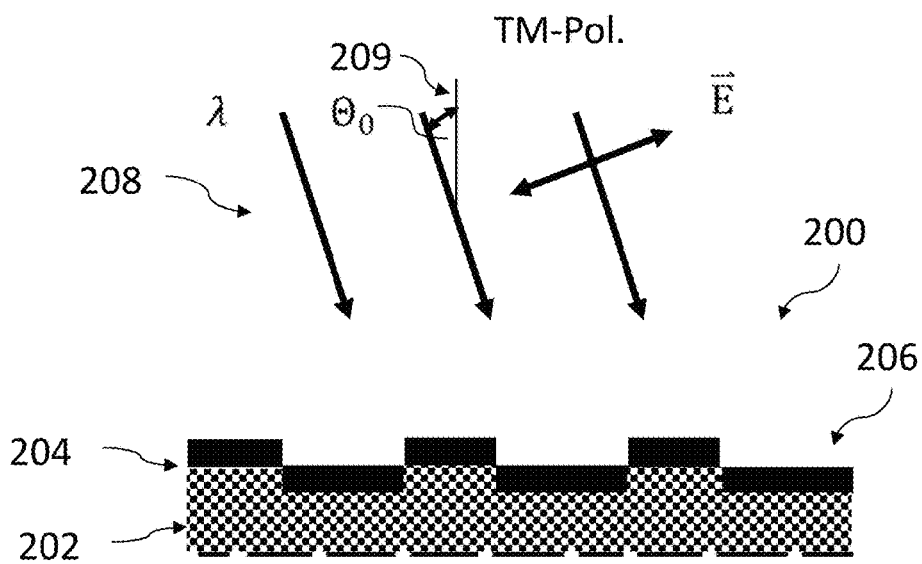
FIG. 2 a schematic representation for the irradiation of a layer element with TM-polarized radiation.

In FIG. 2 is shown a layer element 200 with a carrier substrate 202 and a (first) structure (surface structure/interface structure) 204 which corresponds to a rectangular profile, with the structure 204 being covered with a metal layer 206. In other words, the first structure of the carrier substrate and the metal layer form a metallic grating. The carrier substrate 202 is dielectric. As indicated schematically, said (surface) structure is irradiated with TM-polarized electromagnetic radiation 208 (light) of the wavelength λ and at an angle of incidence $\Theta_0$. The angle of incidence is based on a normal 209 to the plane spanned by the structure 204. When the above-described conditions for conservation of momentum are fulfilled, SPPs can be excited at the interface that is formed by the structure 204 and metal layer 206. This excitation has the consequence that a large share of the incident electromagnetic radiation 208 is absorbed in the metal of the metal layer 206. In the present case, the carrier substrate 202 is a carrier layer, namely, an emboss-lacquer layer.

Advantageously, this radiation absorption is substantially higher with height-modulated structures/relief structures than with smooth metal surfaces/metal faces. This radiation absorption is detectable for example via a decreased reflection or transmission of the incident radiation. The absorbed radiation is transformed into heat in the metal. A very high heat input through SPPs causes removing/ablation of the metal.

In the case of the metal layer 206 represented in FIG. 2, the metal layer 206 is removed or ablated through the coupling in of the light 208 by means of excitation of SPPs. Advantageously, the dielectric carrier structure 202 is not noticeably changed by the excitation of SPPs or by the heat input.

Figure 3A:
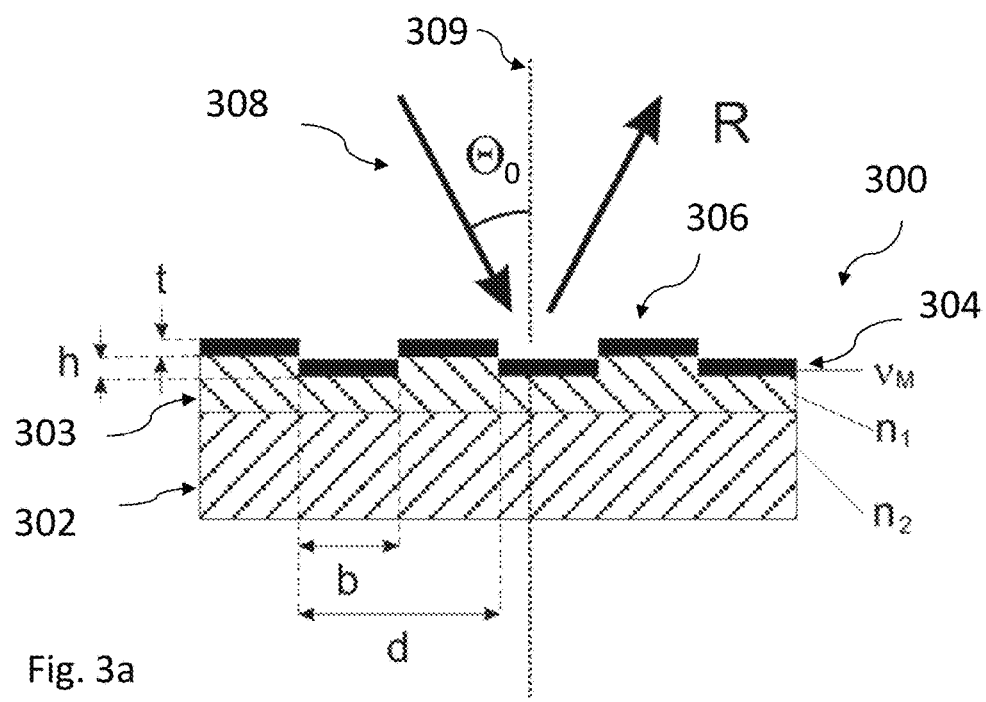
FIGS. 3a-c schematic representations for the irradiation of a layer element.
Figure 3B:
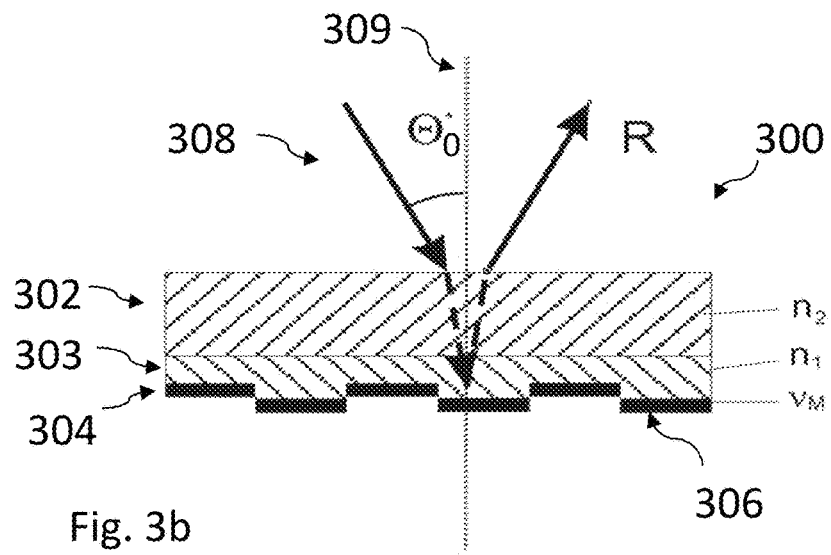
Figure 3C:
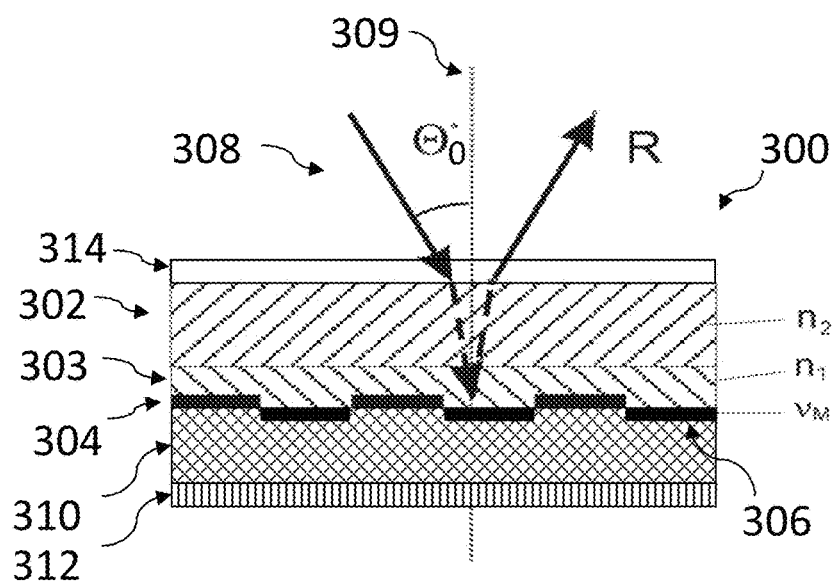

FIGS. 3a to 3c show schematic representations for the irradiation of a layer element 300 in a sectional view. The layer element 300 comprises a dielectric carrier film 302 and an emboss-lacquer layer 303 as well as a metal layer 306. The carrier film 302 and the emboss-lacquer layer 303 form a carrier substrate. The emboss-lacquer layer 303 is modulated, i.e. the emboss-lacquer layer has a (first) structure (surface structure) 304. On the face of the emboss-lacquer layer 303, i.e. on the (first) structure 304, the metal layer 306 is vapor-deposited or applied. The structure 304 has a periodic rectangular profile as a structure.

The layer element 300 is characterized by the following geometric parameters: period d (double structure width) of the structure 304, structure depth h, width b of the structure 304 and the layer thickness t of the metal layer. The layer element 300 is further characterized by the following optical constants: complex refractive index $v_M$ of the metal layer 306, refractive index $n_1$ of the emboss-lacquer layer and refractive index $n_2$ of the carrier film. The angle of incidence $\Theta_0$ is formed by the direction of the incident light 308/incident radiation in the plane of incidence and the normal 309 to the plane spanned by the structure 304.

The layer element 300 in FIG. 3a differs from the representation in 3b in that it is mirrored vertically. Consequently, the metal layer 306 is irradiated differently in FIGS. 3a and 3b. In FIG. 3a is shown a situation in which the metal layer 306 is illuminated directly. In other words, upon the irradiation of the layer element 300 the incident light 308 impinges on the metal layer 306 first/directly. In other words, on the side of the incident light 308 there is located a medium with the refractive index 1 (=air). Therefore, the incident light 308 impinges on the interface of air and metal layer 306.

In contrast, in FIG. 3b is shown a situation in which the metal layer 306 is illuminated indirectly. In other words, the irradiated radiation 308 first penetrates the carrier substrate, i.e. carrier film 302 and emboss-lacquer layer 303, before the incident radiation/light 308 impinges on the metal layer 306. In other words, on the side of the incident light 308 there is located a medium with the refractive index>1 (=emboss lacquer). Therefore, the incident light 308 impinges on the medium emboss-lacquer layer 303 before impinging on the interface of metal layer 306 and emboss-lacquer layer 303.

With an embodiment or irradiation according to FIG. 3b, it is to be taken into consideration that the radiation is refracted upon passage through the carrier film 302 with the refractive index $n_2$ as well as on the emboss-lacquer layer 303 with the refractive index $n_1$. Assuming the refractive indices of emboss-lacquer layer 303 and carrier film 302 are the same, then the angle of incidence $\Theta_0$ on the metal layer 306 is computed by Snell's law: $n_0 \sin \Theta_0 = n_2 \sin \Theta_2$. Should the refractive indices of emboss-lacquer layer 303 and carrier film 302 differ, the refraction of the incident radiation at the transition from emboss-lacquer layer 303 and carrier film 302 would also have to be taken into consideration by application of said formula for the computation of the angle of incidence on the metal layer 306. Further, the wavelength of the irradiated radiation also changes in the dielectric carrier substrate. Hence, in this case the resonance characteristic of the layer element is shifted into the long-wave range by the factor of the refractive index.

FIG. 3c has in comparison to the embodiments according to FIGS. 3a and 3b a further layer, namely, the layer 310. The layer 310 is a dielectric layer. An irradiation of the layer element 300 in the case of a buildup according to FIG. 3c can be effected as shown, by the layer element 300 or the metal layer 306 being irradiated from the side of the emboss-lacquer layer 303. Alternatively or additionally, an irradiation can be effected from the side of the layer 310, not shown. In particular, the layer element 300 can have further layers, such as the layers 312, 314, which are arranged on the carrier film 302 and/or on the layer 310, so that the metal layer 306 is enclosed by a plurality of layers or embedded between a plurality of layers. The angle of incidence $\Theta_0$ as marked in FIG. 3c is of course not marked correctly when the further layer 314 is present. In this case, the angle of incidence $\Theta_0$ would have to be computed analogously, as described for FIG. 3b, employing Snell's law.

In the case of an irradiation according to FIG. 3c, the metal layer 306 is preferably removed by transformation. If the metal layer 306 is for example an aluminum layer, the aluminum layer can be transformed to an aluminum oxide by irradiating by means of the incident light 308. Preferably, a thus transformed metal layer 306 appears translucent/transparent to a viewer.

Hereinafter the excitation of SPPs will be discussed for (surface) structures upon an irradiation with radiation of pre-specified wavelength and TM polarization. In this connection, the absorption or the reflection was computed rigorously according to Maxwell's equations for different arrangements.

Figure 4:
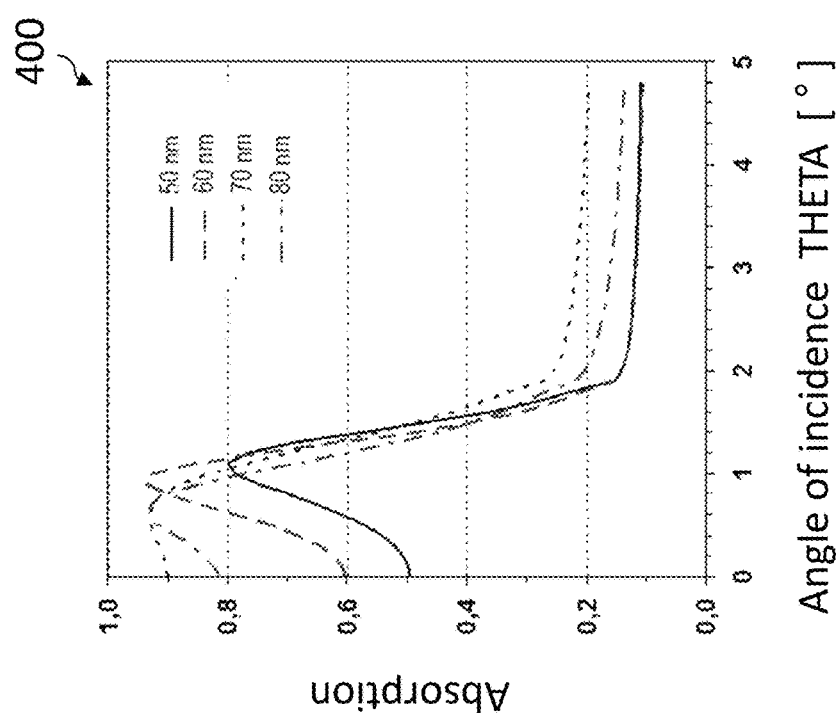

FIG. 4 shows a diagram 400 which illustrates absorption as a function of angle of incidence for the layer thicknesses t=50 nm, t=60 nm, t=70 nm and t=80 nm upon TM-polarized light incidence/irradiation. The diagram 400 is based on a layer element and an incidence situation as shown in FIG. 3a. Further, the diagram is based on the following values:
irradiation with a radiation of the wavelength $\lambda$=1064 nm
d=1030 nm (period of the structure 304)
b=515 nm (width of the structure 304)
h=60 nm (structure depth of the structure 304)
$n_1$=1.52 (refractive index of the emboss-lacquer layer 303)
metal layer: vapor-deposited aluminum As evident from FIG. 4, all spectra show a pronounced maximum of absorption for the angle $\Theta_0 \sim 1°$. At this angle of incidence SPPs are excited and more than 80% of the incident light is absorbed. The layer thicknesses 60 nm to 80 nm appear especially favorable for demetallization.

Figure 5A:
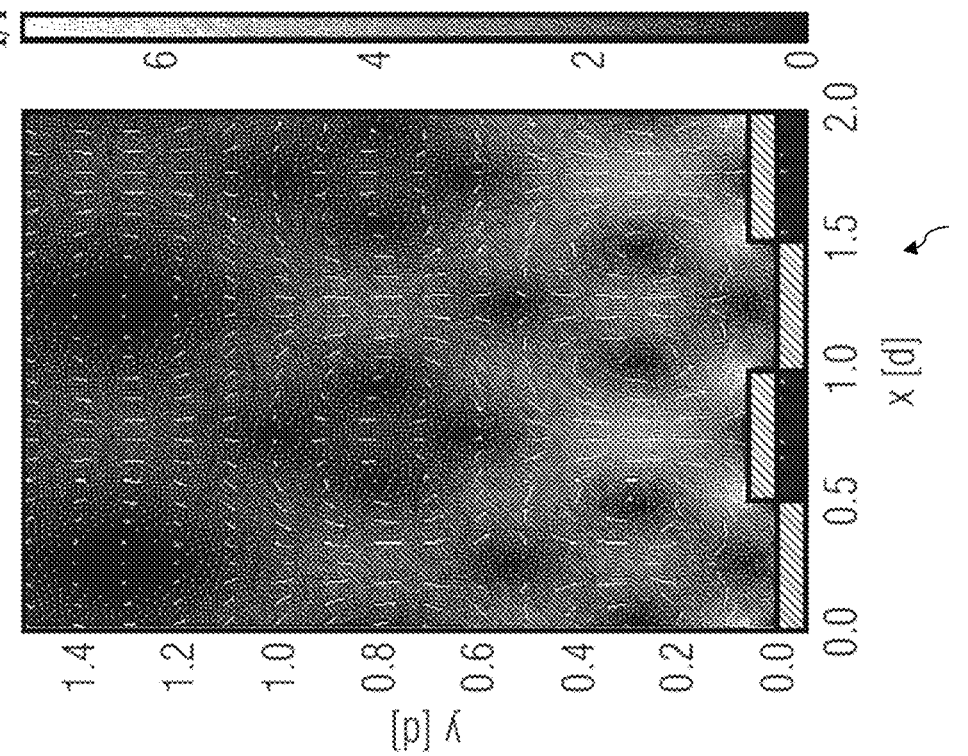
Figure 5B:
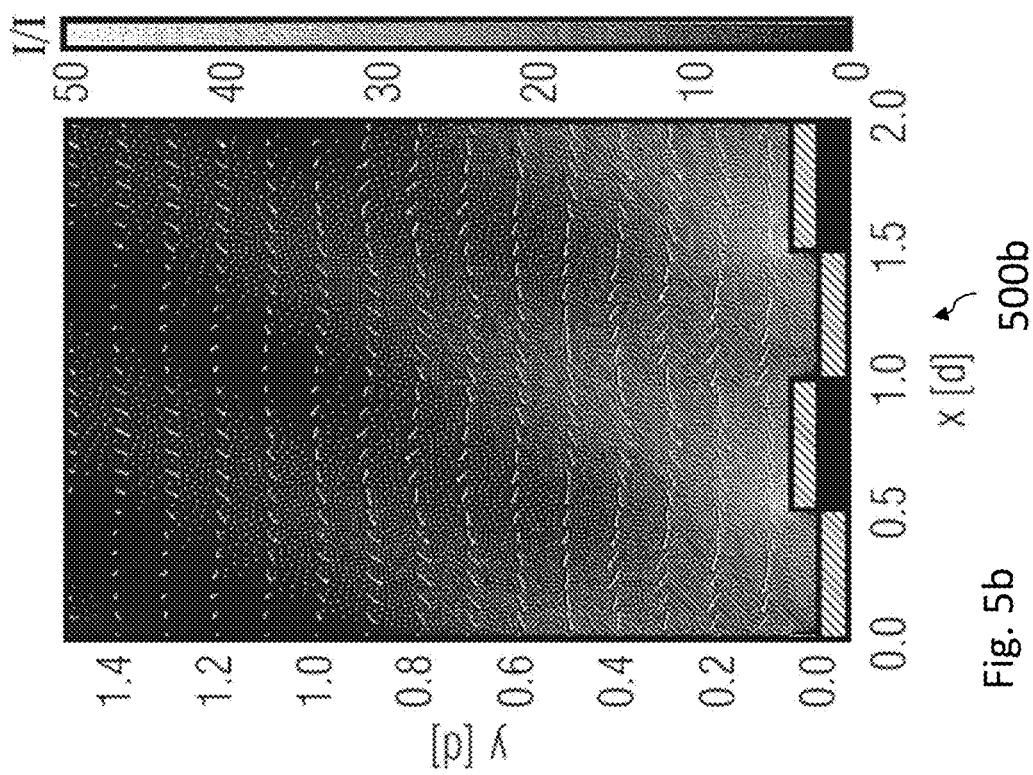

FIGS. 5a and 5b respectively show a simulation 500a, 500b of the electromagnetic near-fields upon excitation of SPPs for a layer element according to FIGS. 3a and 4. The simulations 500a, 500b show both energy flow (Poynting vector) and intensity for the above-mentioned example of a layer element according to FIG. 4 with a layer thickness t=60 nm of the metal layer made of aluminum. In FIG. 5a an irradiation situation is simulated in which an irradiation takes place perpendicular to the structure (surface structure) 304 or the metal layer 306. In FIG. 5b an irradiation situation is simulated in which an irradiation takes place at an angle of incidence $\Theta_0$=0.9°.

The x and y coordinates of the simulation 500a and 500b are normalized to the period d. The arrows represent the direction of the local energy flow, and the arrow length the logarithm of its amount.

Upon perpendicular irradiation, as in FIG. 5a, vortexes arise in the energy flow near the metallized (surface) structure. The electromagnetic field strength is about 6× higher on the surface/face than in the far-field. The field distribution changes dramatically when the grating/first structure is now tilted by 0.9°. The intensity on the metal layer 306 increases to the factor of 50. A high energy flow is propagated along the structure 304 or the metal layer 306. These excited SPPs are damped and finally absorbed on account of the interaction with the metal layer 306. Thus, the incident light turns into heat via the excitation of the SPPs on the metal layer 306.

Figure 6:
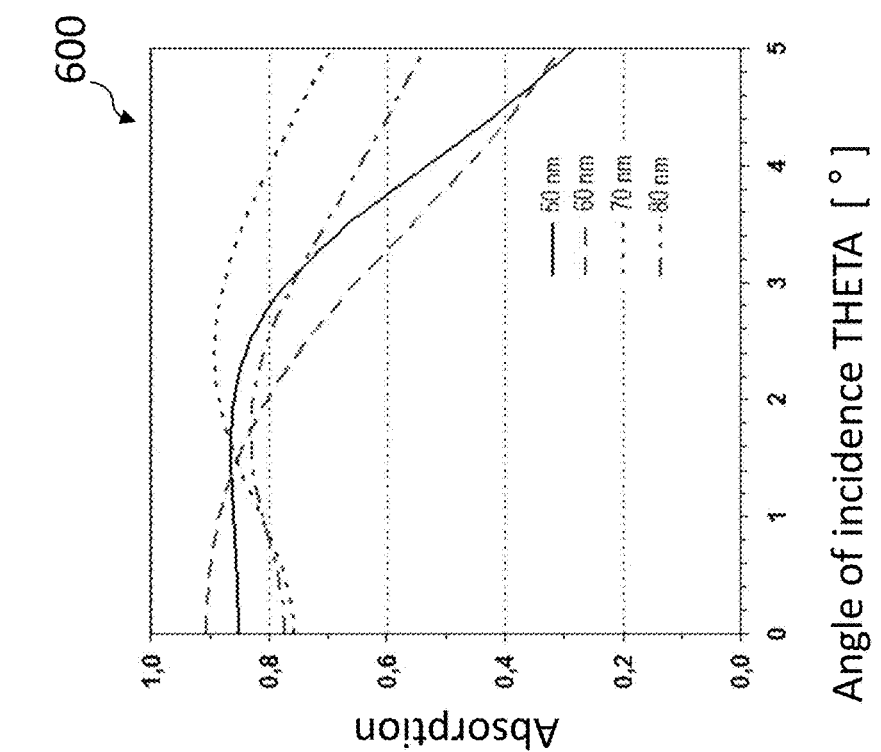
FIG. 6 a diagram with absorption as a function of angle of incidence for different layer thicknesses and at TM-polarized irradiation for a layer element according to FIG. 3b.

FIG. 6 shows a diagram 600 representing absorption as a function of angle of incidence for the layer thicknesses t=50 nm, t=60 nm, t=70 nm and t=80 nm upon TM-polarized light incidence/irradiation. The diagram 600 is based on a layer element and an incidence situation as shown in FIG. 3b. Further, the diagram 600 is based on the following values:
irradiation with a radiation of the wavelength $\lambda$=1064 nm
d=660 nm (period of the structure 304)
b=330 nm (width of the structure 304)
h=60 nm (structure depth of the structure 304)
$n_1$=1.52 (refractive index of the emboss-lacquer layer 303)
metal layer: vapor-deposited aluminum As is evident from the diagram 600, all spectra show a maximum of absorption for an angle range $\Theta_0$ of 0° to 3°. At these angles of incidence the excitation of SPPs takes place, with about 80% of the incident light being absorbed. For increasing oblique angles of incidence the light absorption strongly decreases. With this arrangement it is advantageous that the excitation of SPPs is effected with a substantially higher angular tolerance than with an arrangement according to FIGS. 3a and 4. This is advantageous since the beam divergence of the incident radiation must be tolerated less closely when realizing a buildup for demetallization.

FIGS. 7a and 7b respectively show a simulation 700a, 700b of the electromagnetic near-fields upon excitation of SPPs for a layer element according to FIGS. 3b and 6. The representations 700a, 700b of FIGS. 7a and 7b are to be interpreted analogously to FIGS. 5a and 5b with regard to the manner of representation.

The essential difference of the simulations 700a, 700b in comparison to those of FIGS. 5a and 5b involves the employed parameters and the irradiation situation. The layer thickness t of the metal layer 306 made of aluminum amounts to t=70 nm here. The field distribution for perpendicular incidence is similar to the simulations 500a and 700a. In the simulation 700a the intensity on the metal layer is higher by about a factor of 6 compared with the far-field. Upon a change of the angle of incidence to $\Theta_0=2.4°$ this value lies at a factor ~20 according to simulation 700b. The field is more strongly localized on the metal layer than in the simulations 500a, 500b and the maximum field intensity is lower.

Figure 8A:
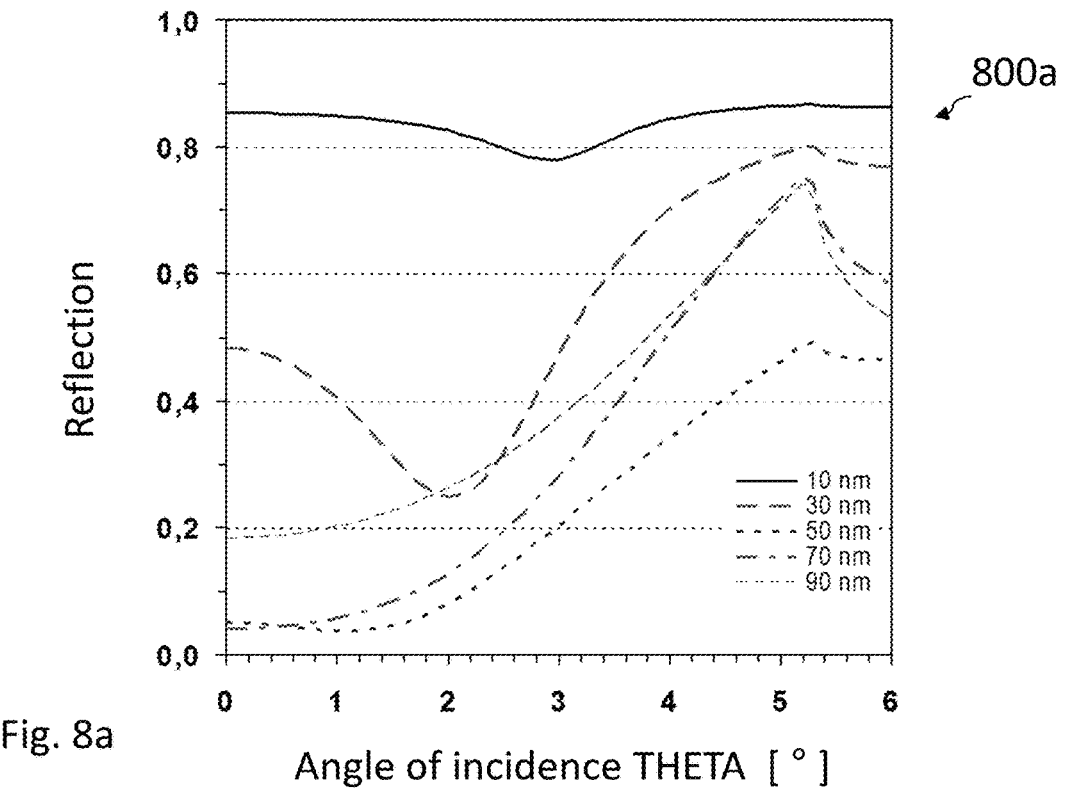
FIG. 8a, b diagrams relating to the influence of profile height h on reflection as well as absorption of a layer element according to FIGS. 6 to 7b as a function of angle of incidence.
Figure 8B:
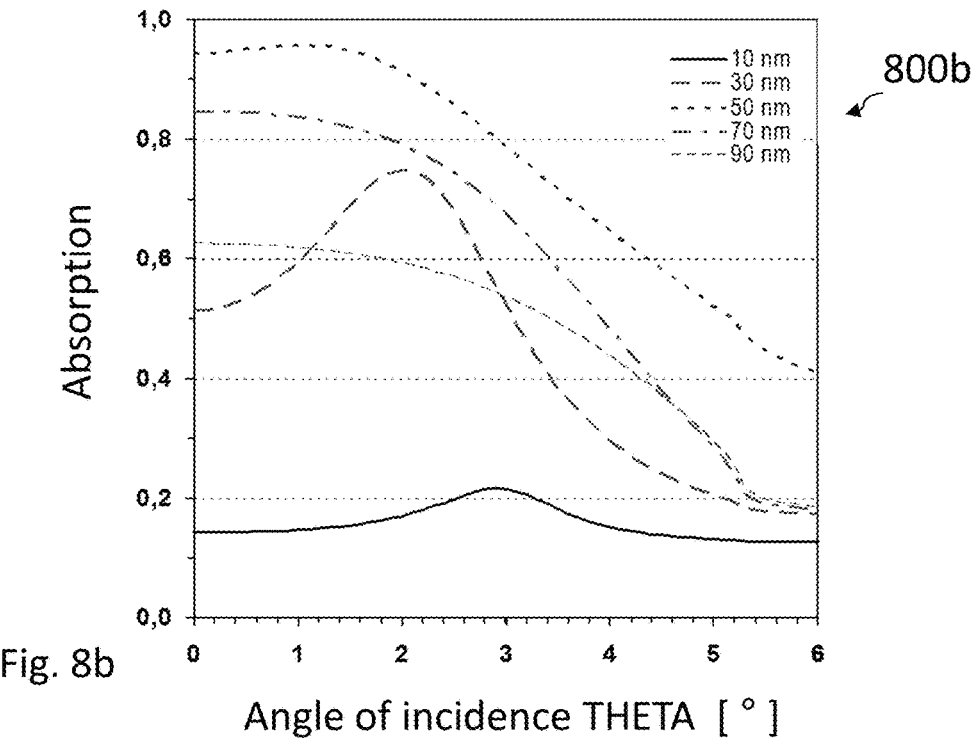

The diagrams 800a, 800b shown in FIGS. 8a and 8b represent the influence of profile height h on reflection as well as absorption of a layer element according to FIGS. 6 to 7b as a function of angle of incidence at $\lambda=1064$ nm. Deviating from the parameters for FIG. 6, the diagrams 800a, 800b are based on the following parameters:
  layer thickness t=60 nm of the metal layer 303 made of aluminum
  different structure depths h=10 nm; 30 nm; 50 nm; 70 nm; and 90 nm The diagram 800a shows the influence of structure depth h on reflectance. The diagram 800b shows the influence of structure depth h on absorptance. The resonance or the excitation of SPPs can be distinctly recognized in these spectra. For increasing structure depths h the resonance shifts to smaller angles of incidence.

Figure 9A:
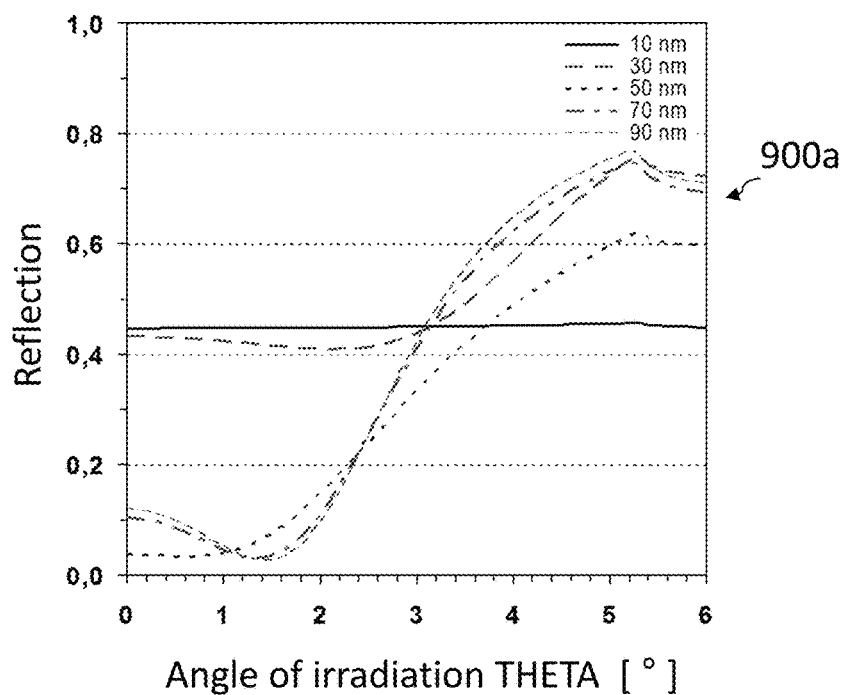
FIG. 9a, b diagrams relating to the influence of layer thickness t on reflection as well as absorption of a layer element according to FIGS. 6 to 7b as a function of angle of incidence.
Figure 9B:
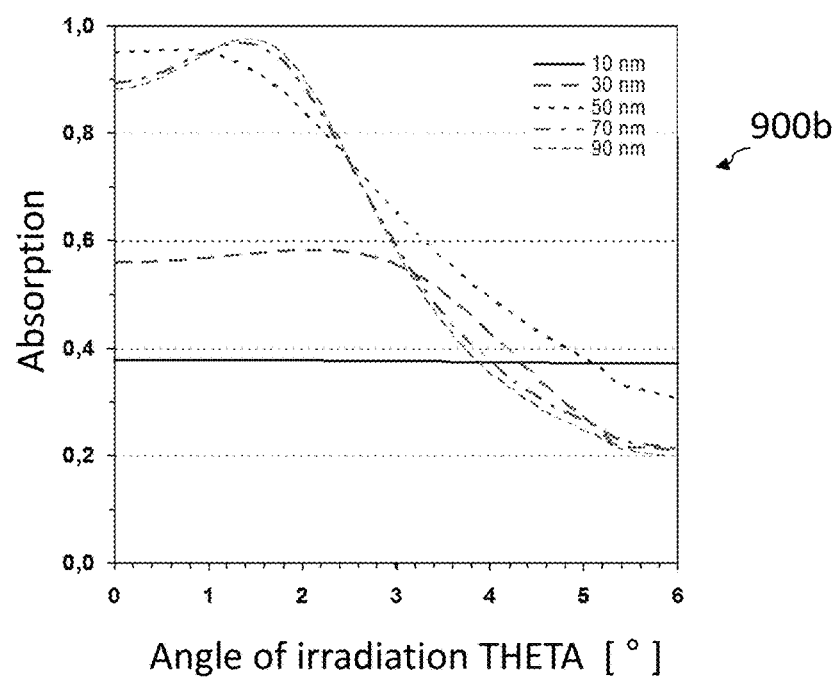

The diagrams 900a, 900b shown in FIGS. 9a and 9b represent the influence of layer thickness t on reflection as well as absorption of a layer element according to FIGS. 6 to 7b as a function of angle of incidence at $\lambda=1064$ nm. Deviating from the parameters for FIG. 6, the diagrams 900a, 900b are based on the following parameters:
  structure depth h=40 nm
  different layer thicknesses t=10 nm; 30 nm; 50 nm; 70 nm; and 90 nm of the metal
  layer 303 made of aluminum It is evident from FIGS. 9a and 9b that the resonances or excitation of SPPs are distinctly formed as of a layer thickness t of ~40 nm.

Figure 10A:
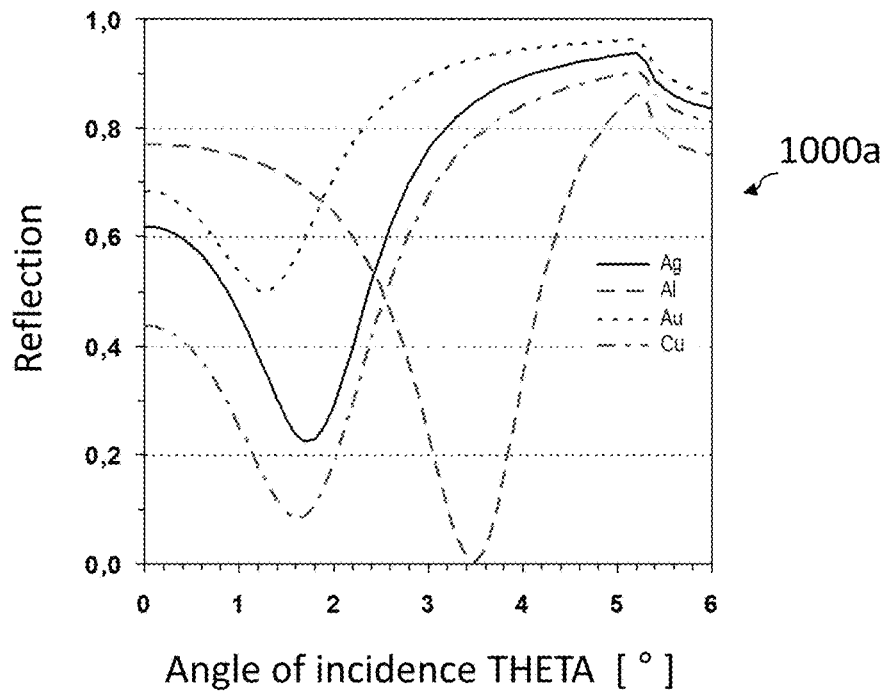
FIG. 10a, b diagrams relating to the influence of the material employed for the metal layer on reflection as well as absorption of a layer element according to FIGS. 6 to 7b as a function of angle of incidence.
Figure 10B:
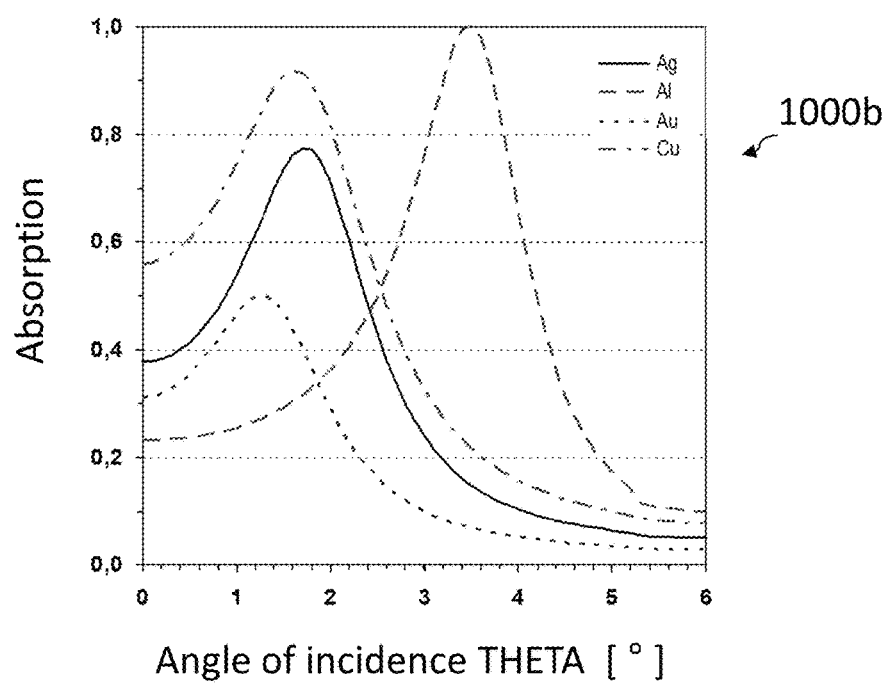

The diagrams 1000a, 1000b shown in FIGS. 10a and 10b represent the influence of the material employed for the metal layer 303 on reflection as well as absorption of a layer element according to FIGS. 6 to 7b as a function of angle of incidence at $\lambda=1064$ nm. The diagrams are based on the following parameters:
  d=660 nm (period of the structure 304);
  b=330 nm (width of the structure 304);
  h=40 nm (structure depth of the structure 304);
  t=70 nm (layer thickness of the metal layer 303);
  different materials of the metal layer 303: silver (Ag), aluminum (Al), gold (Au) and copper (Cu)

The different layer elements based on the above parameters respectively show a resonance maximum in absorption and matchingly a minimum in reflection. This resonance (excitation of SPPs) is most pronounced for aluminum under the pre-specified geometric parameters.

Figure 11A:
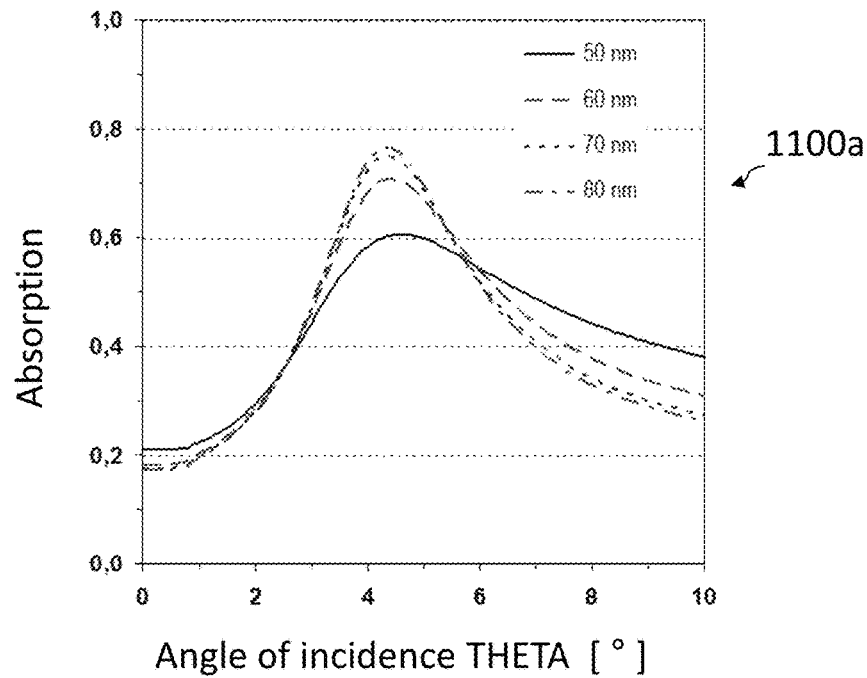
Figure 11B:
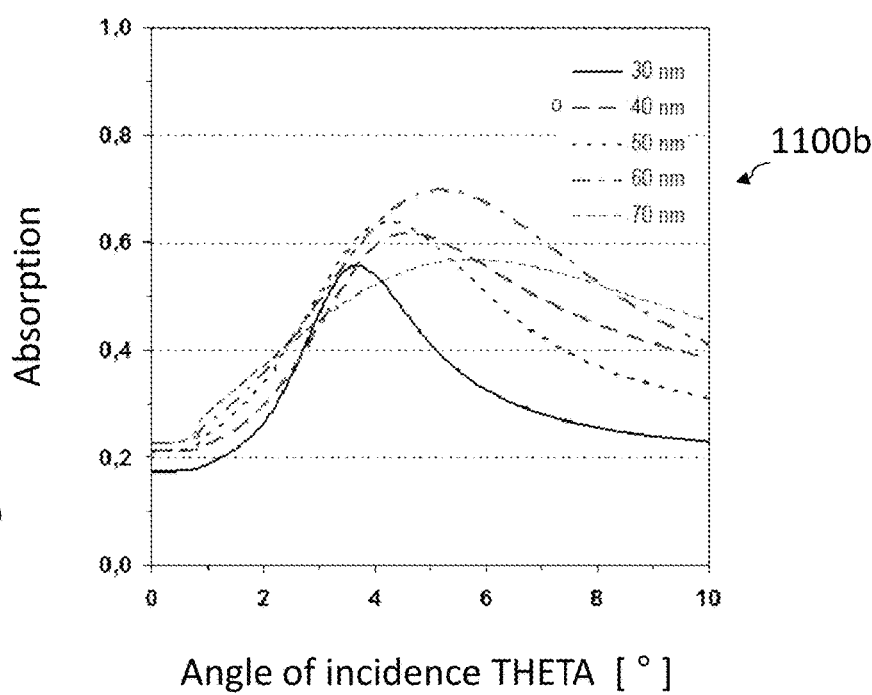
Figure 11C:
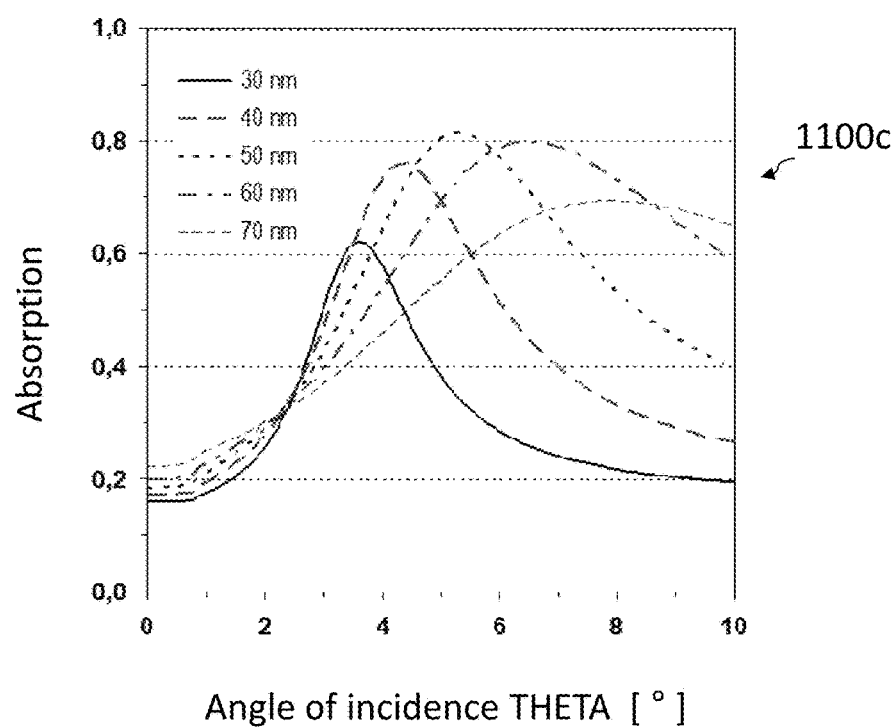

The diagrams 1100a, 1100b, 1100c shown in FIGS. 11a to 11c represent absorption as a function of angle of incidence at TM-polarized light incidence with a wavelength of $\lambda=532$ nm. The diagrams 1100a, 1100b, 1100c are based on a layer element and an incidence situation as shown in FIG. 3a. Further, the diagram is based on the following values:
Parameters for diagram 1100a:
  irradiation with a radiation of the wavelength $\lambda=532$ nm
  d=540 nm (period of the structure 304)
  b=270 nm (width of the structure 304)
  h=40 nm (structure depth of the structure 304)
  metal layer: vapor-deposited aluminum
  $n_1$=1.52 (refractive index of the emboss-lacquer layer 303)
  different layer thicknesses t=50 nm; 60 nm; 70 nm; and 80 nm
Parameters for diagram 1100b:
  irradiation with a radiation of the wavelength $\lambda=532$ nm
  d=540 nm (period of the structure 304)
  b=270 nm (width of the structure 304)
  t=50 nm (layer thickness of the metal layer 306)
  metal layer: vapor-deposited aluminum
  $n_1$=1.52 (refractive index of the emboss-lacquer layer 303)
  different structure depths h=30 nm; 40 nm; 50 nm; 60 nm; and 70 nm
Parameters for diagram 1100c:
  irradiation with a radiation of the wavelength $\lambda=532$ nm
  d=540 nm (period of the structure 304)
  b=270 nm (width of the structure 304)
  t=80 nm (layer thickness of the metal layer 306)
  metal layer: vapor-deposited aluminum
  $n_1$=1.52 (refractive index of the emboss-lacquer layer 303)
  different structure depths h=30 nm; 40 nm; 50 nm; 60 nm; and 70 nm All spectra in the diagrams 1100a, 1100b, 1100c show a pronounced maximum of absorption for the angle $\Theta_0$—4°. From the spectra it is evident that a structure depth h of 40 nm to 70 nm at a layer thickness t of 60 nm to 80 nm and aluminum as the material for the metal layer prove especially favorable for the excitation of SPPs.

With reference to the preceding remarks it is to be noted that the structure/surface structure need not have a rectangular structure or rectangular profile to attain an excitation of SPPs. SPPs can also be excited when the structure or profile deviates from a rectangular form, being for example sinusoidal. Further, the above-described resonance effects, i.e. the excitation of SPPs, can also occur on two-dimensionally periodic structures and therefore lead to the elevated light absorption.

Figure 12:
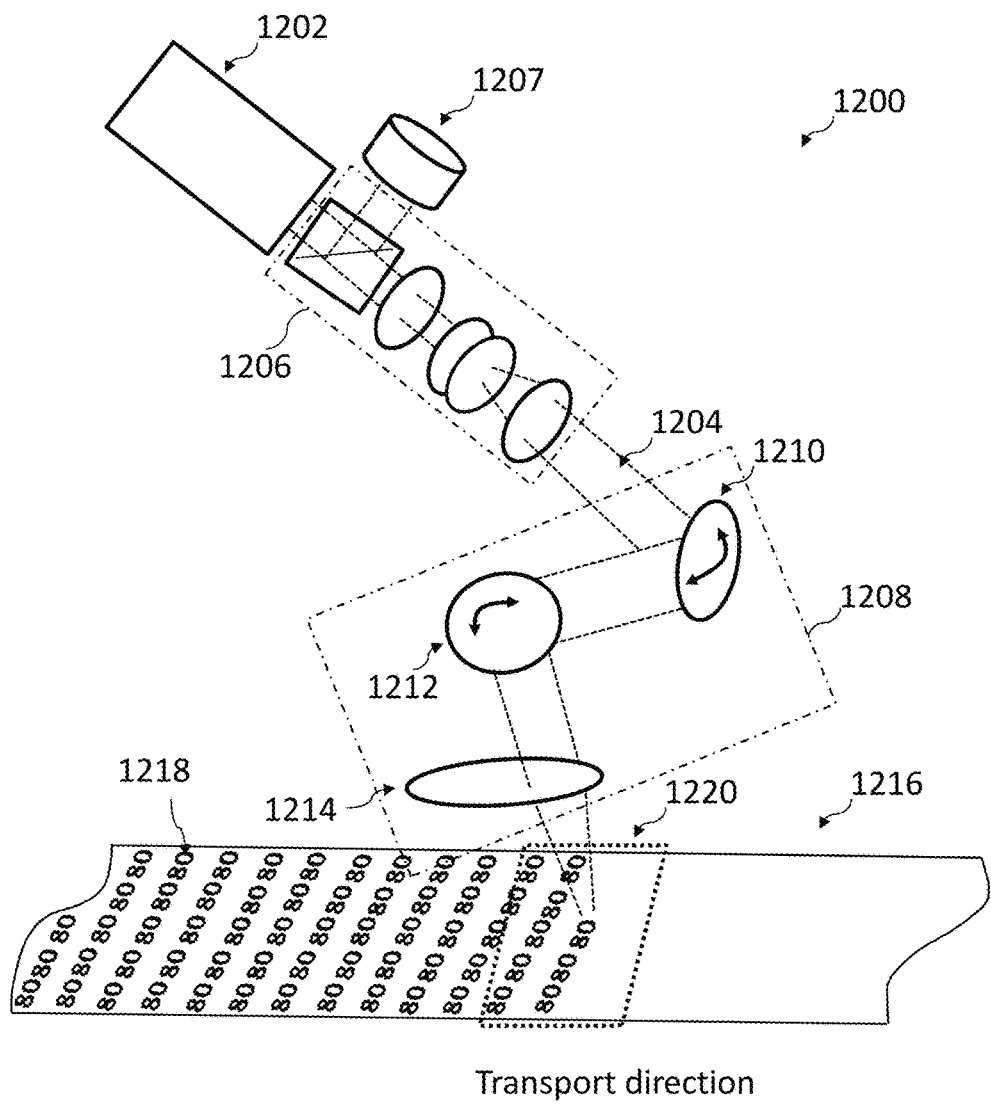
FIG. 12 schematic representation of an apparatus for partially demetallizing layer elements.

FIG. 12 shows schematically an apparatus for partially demetallizing a layer element. The apparatus has a laser device 1200 for irradiating the layer element with laser radiation 1204 in an irradiation zone 1220. A transport device (not shown) for transporting the layer element transports the respective layer element into and out of the irradiation zone 1220. Preferably, a plurality of layer elements are arranged on a layer-element starting material 1216, so that a plurality of layer elements can be irradiated simultaneously and/or successively in a continuous method. The laser device 1200 is designed to excite, in the irradiation zone 1220, SPPs on the metal layer of the respective layer element, so that the metal layer is removed in a first region/surface region 1218 (here in the form of the numeral 80) having a first structure/surface structure.

Preferably, the laser device 1200 comprises a laser source 1202, an optical unit 1206, an absorber 1207 for absorbing any filtered-out light or laser radiation, as well as a beam guiding device 1208. The beam guiding device 1208 preferably comprises at least one beam deflecting device 1210, which can be for example a swiveling mirror. Additionally, the beam guiding device 1208 can comprise a second beam deflecting device 1212, which can likewise be a swiveling mirror. Further preferably, the beam guiding device 1208 comprises a plane-field lens 1214, which comprises for example an F-Theta objective or a telecentric F-Theta objective.

The beam guiding device 1208 can also be configured for example as a so-called scanner device. For example, the beam guiding device 1208 can correspond to a 2D scanner, as represented. Alternatively, a beam guiding device can also be configured as a 3D scanner or polygonal wheel, etc. Further alternatively, a beam guiding device can also be equipped with a fixed line optic in order to irradiate the laser radiation in the necessary region (irradiation zone) of the respective regions of the layer elements.

Figure 13:
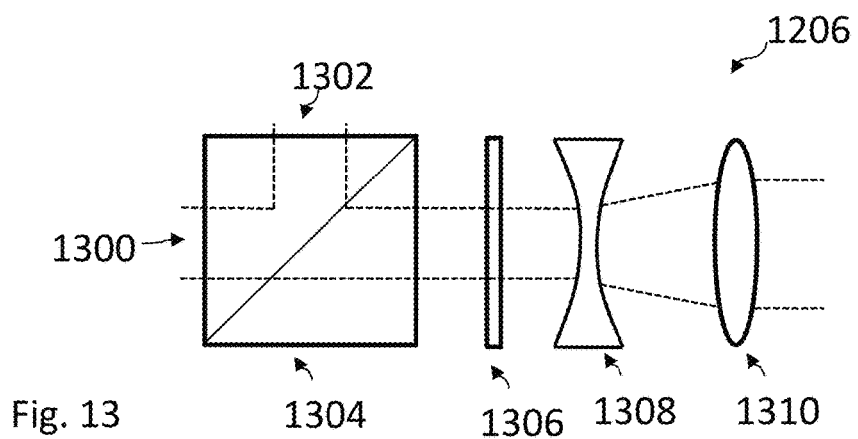
FIG. 13 a schematic representation of an optical unit.

FIG. 13 shows a schematic enlargement of the optical unit 1206 which can optionally have the laser device 1200. The optical unit 1206 preferably comprises a polarizer 1302 which polarizes incoming laser radiation 1300. Alternatively, a laser device 1200 can be designed such that it produces already polarized laser radiation, by which additional polarizing components in the further beam path could be omitted and efficiency could be distinctly increased. For this purpose, shares not corresponding to a certain polarization are filtered as radiation 1302 out of the beam path for the polarized laser radiation. In particular, unpolarized laser radiation can be transformed (filtered) into polarized laser radiation in a polarization beam splitter cube or a Glan prism as a polarizer. Furthermore, the optical unit 1206 can comprise a polarization rotator 1306, so that incoming laser radiation is further influenced in its polarization direction to enable an irradiating of a layer element with TM-polarized laser radiation. For example, a polarization rotator 1306 can be a λ/2 plate. Further, the optical unit 1206 can have one or more lenses/lens systems 1308, 1310 in order to enlarge or reduce the beam cross section of the laser radiation 1300. The laser radiation 1300 emanating from the optical unit 1206 is then advantageously conditioned in its beam cross section.

Figure 14:
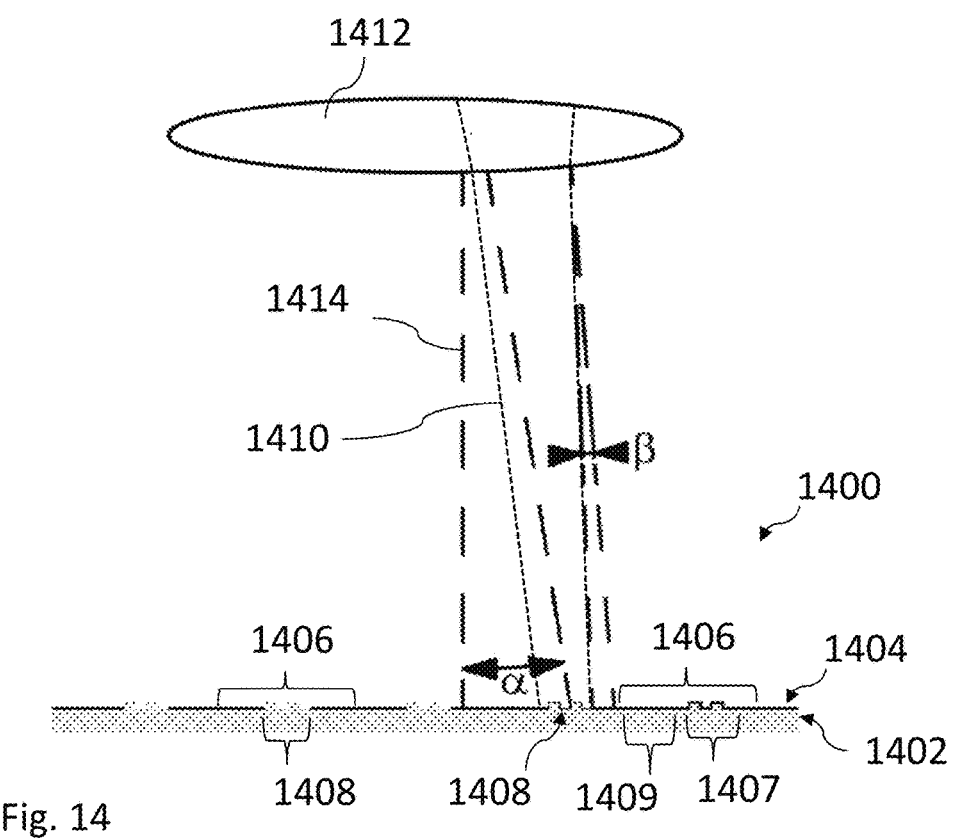
FIG. 14 a schematic representation of an irradiation situation of a layer element.

FIG. 14 shows a schematic representation of an irradiation situation of a layer element 1406 with a first region/surface region 1407 and at least one second region/surface region 1409. The first region 1407 has a first structure (surface structure) 1408, while the at least one second region 1409 has a second structure (surface structure) which is different from the first structure. In particular, FIG. 14 shows a layer-element starting material 1400 with a plurality of layer elements 1406, with the layer-element starting material 1400 or the layer elements 1406 comprising a carrier substrate 1402 and a metal layer 1404. Laser radiation 1410 is radiated onto the layer element 1406 or the layer-element starting material 1400 via a plane-field lens 1412 (can correspond to the plane-field lens 1214). By means of a beam guiding device (not shown)—such as the beam guiding device 1208—the laser radiation 1410 is guided such that an irradiation of the metal layer 1404 of the layer element 1406 is effected at an angle of irradiation or incidence α based on a normal 1414. The angle of incidence α is preferably in the range of 0°<α<5°. The normal 1414 is the normal to the plane spanned by the first structure. Preferably, the laser radiation 1410 impinging on the metal layer 1404 has a beam divergence with a divergence angle β, with the divergence angle θ preferably being smaller than 5°, particularly preferably smaller than 1°, in the direction of the plane of incidence of the laser radiation. The plane of incidence of the laser radiation 1410 in FIG. 14 corresponds to the drawing plane. The divergence angle in the direction normal/perpendicular to the plane of incidence (not shown) is preferably smaller than 10°. In the present FIG. 14, the divergence angle corresponds in the direction perpendicular to the plane of incidence to the direction perpendicular to the drawing plane of FIG. 14. In the irradiation situation shown in FIG. 14, the laser radiation impinges on the metal layer 1404 of the layer element 1406 first/directly.

Figure 15:
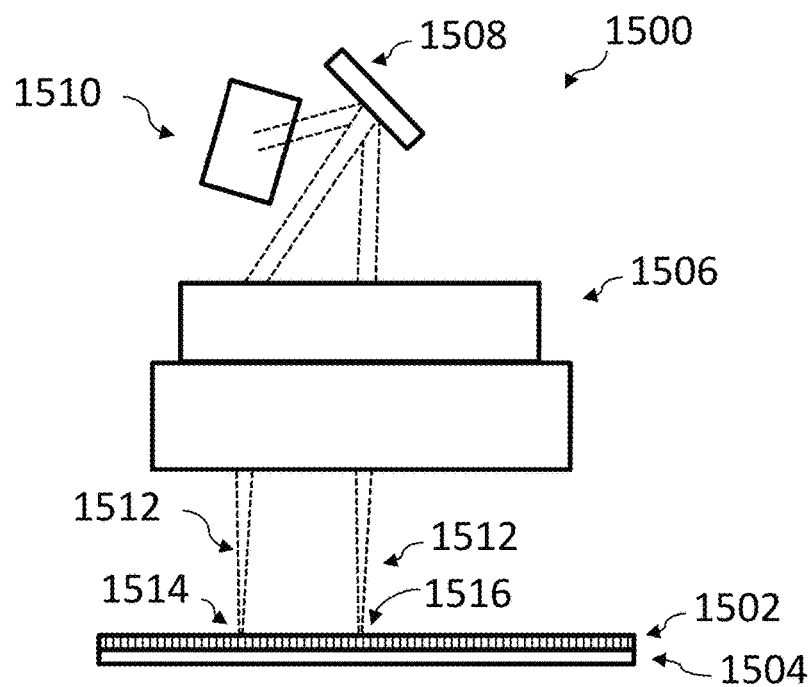
FIG. 15 a schematic representation of a beam guidance of a beam guiding device.

FIG. 15 shows a schematic representation of a beam guidance of a beam guiding device 1500 in an irradiation zone in cross section, e.g. transversely to a transport direction of a layer element 1504, which can correspond to a layer element 1400. The beam guiding device 1500 comprises beam deflecting devices 1508, 1510, which can correspond to the beam deflecting devices 1210, 1212, and a telecentric F-Theta objective 1506. The beam guiding device 1500 is designed or realized so as to adapt the focal position of a laser radiation 1512 to a focal plane 1502, so that the focal plane 1502 is parallel to the plane spanned by the first structure/surface structure of the layer element 1504. The focal plane 1502 can lie in particular in the plane that is spanned by the first structure. Preferably, the beam guiding device 1500 is designed such that the laser radiation can be guided over a region in the irradiation zone that is greater than the beam cross section of the laser radiation 1512, so that an irradiation by means of laser radiation 1512 can be effected at every point 1514, 1516 of a region to be irradiated, at the same pre-specified angles of incidence or incidence conditions.

Figure 16:
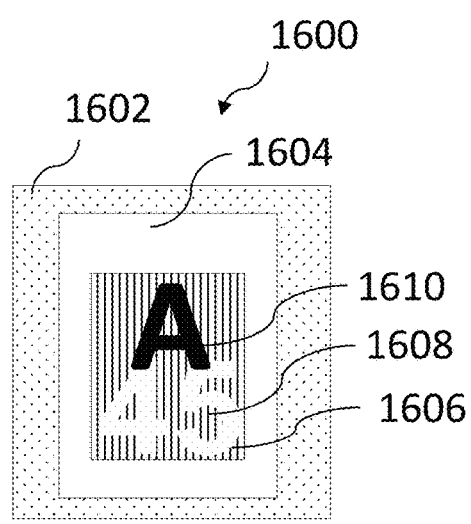
FIG. 16 a schematic detail of a value document in plan view.

FIG. 16 shows a schematic detail of a value document 1600 which comprises a value-document substrate 1602 and a security element 1604. The security element 1604 is based on a layer element that was partially demetallized by means of excitation of SPPs. The security element 1604 has a hologram region 1606, a reflective region 1610 and a demetallized region 1608. The demetallized region 1608 corresponds to a first region or surface region and has a first structure or surface structure. The hologram region 1606 or the reflective region 1610 corresponds to a second region/surface region. The structure or surface structure of the hologram region 1606 corresponds to a relief structure. The structure/surface structure of the reflective region 1610 corresponds to a relief-free structure. The structures of the hologram region 1606 and of the reflective region 1610 differ not only from each other but also from the structure of the demetallized region 1608.

For manufacturing the security element 1604, a carrier substrate was furnished with a metal layer, with the different structures/surface structures of the hologram region, of the reflective region and of the demetallized region being formed before or after the applying of the metal layer on a face/surface of the carrier substrate. Thereafter the security element 1604 was irradiated areally with laser radiation, thereby causing the metal layer hitherto present to be removed by excitation of SPPs in the demetallized region 1608. Accordingly, the irradiation with laser radiation gave rise to the demetallized region 1608. Advantageously, the metal layer was not damaged in the hologram region and in the reflective region by the selective excitation of SPPs such that a detachment of the metal layer in said regions would be recognizable to a viewer with the naked eye.

FIG. 17 shows a schematic representation of a layer element 1700 in cross section. The layer element 1700 comprises a carrier substrate 1702, a first (surface) region 1704 and a second (surface) region 1706 and a metal layer 1708. The first region 1704 has a first (surface) structure 1710 which has a low aspect ratio e.g. of 0.03. The second region 1706 has a second (surface) structure 1712 which has a higher aspect ratio than the first structure 1710, e.g. of 0.35. The layer element 1700 was irradiated with electromagnetic radiation (light), so that SPPs were excited in the first region 1704, thereby causing a metal layer to be removed in the first region 1704. The second region 1706 was irradiated with the same electromagnetic radiation, but no SPPs as in the first region 1704 were excited in the second region 1706. The metal layer 1708 was hence not removed in the second region 1706.

FIG. 18 shows a schematic representation of a layer element 1800 in cross section. The layer element 1800 comprises a carrier substrate 1802, a first (surface) region 1804 and a second (surface) region 1806 and a metal layer 1808. The first region 1804 has a first (surface) structure 1810 which has an aspect ratio e.g. of 0.02. The second region 1806 has a second (surface) structure 1812 which has a lower aspect ratio than the first structure 1810, e.g. of 0. The layer element 1800 was irradiated with electromagnetic radiation, so that SPPs were excited in the first region 1804, thereby causing a metal layer to be removed in the first region 1804. The second region 1806 was irradiated with the same electromagnetic radiation, but no SPPs as in the first region 1804 were excited in the second region 1806. The metal layer in 1808 was hence not removed in the second region 1806.

Figure 19:
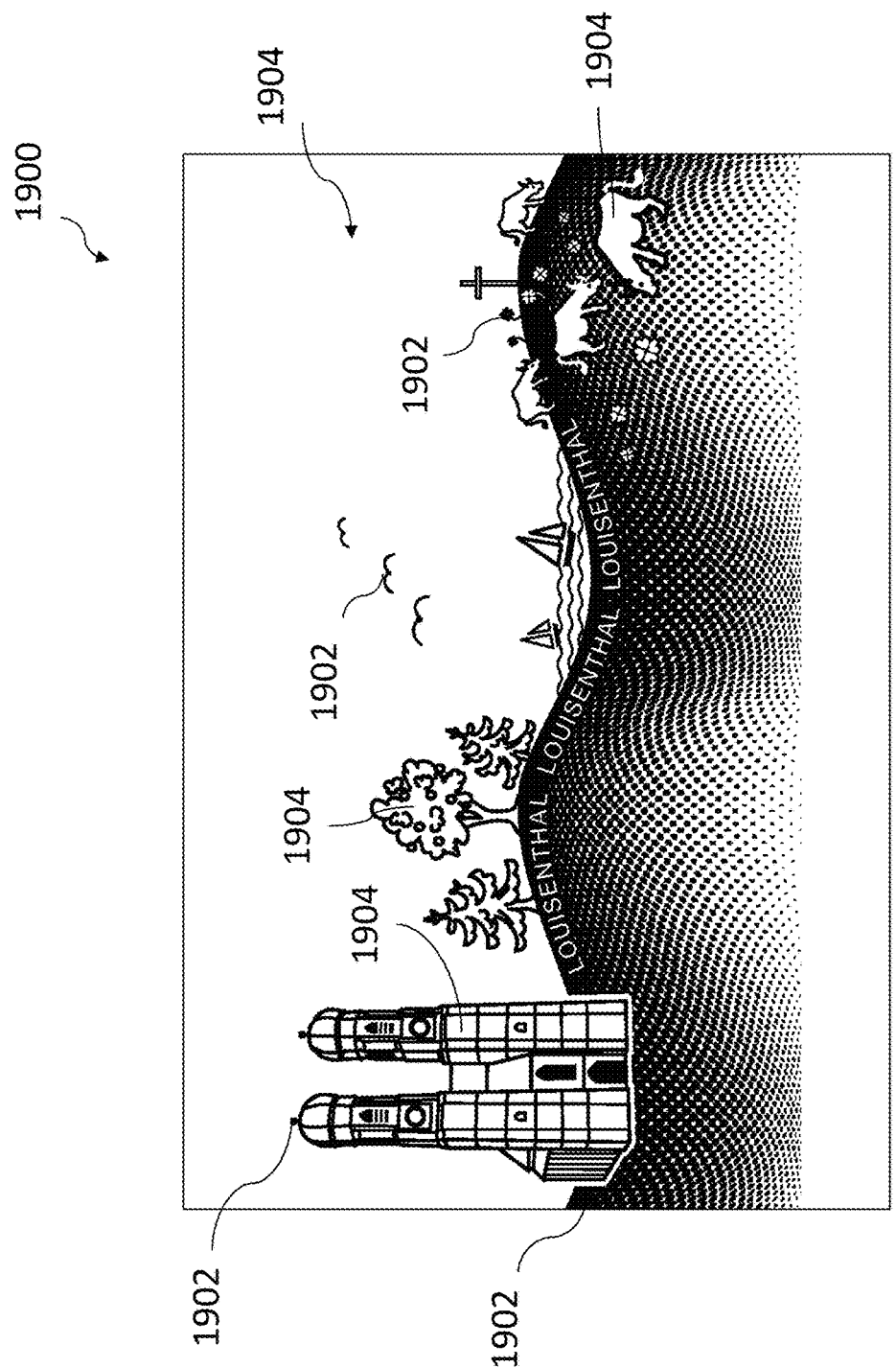
FIG. 19 a schematic representation of a security element in plan view.

FIG. 19 shows a schematic representation of a security element 1900 in plan view. The security element 1900 has substantially two regions, namely, metallized regions and non-metallized regions 1902, 1904. By excitation of SPPs a metal layer originally applied over the full area can be selectively demetallized, whereby it can be stipulated by means of a (surface) structure whether the regions 1902 or the regions 1904 are to be demetallized. Advantageously, the regions 1902, 1904 have a width of up to 4 μm or narrower. In other words, it is advantageously possible to demetallize not only very large regions but also very small regions.

With reference to the preceding remarks it is to be noted that a layer element can have a plurality of mutually different (first) (surface) structures on which SPPs can be excited for a pre-specified wavelength and predetermined angle of incidence. Such mutually different (first) structures can be demetallized for example successively, by the irradiation situation being changed accordingly. For example, the angle of incidence and/or the plane of incidence and/or the polarization of the radiation can be changed.

The invention claimed is:

1. A method for manufacturing a partially demetallized layer element, comprising the steps of:
   supplying a layer element, having
      a carrier substrate with a face having at least one first and one second region, wherein the first region has a first structure which is different from a second structure of the second region, and at least one metal layer arranged on the face of the carrier substrate; and
   removing the metal layer by exciting surface plasmon polaritons by means of electromagnetic radiation in the first region having the first structure;
   wherein the metal layer in the second region is not removable by the excitation of surface plasmon polaritons that contribute to the removing of the metal layer in the first region on account of the first structure.

2. The method according to claim 1, wherein the removing step further comprises: irradiating the first and the second region of the layer element with electromagnetic radiation, wherein the metal layer is removed only in the first region on account of the first structure by the surface plasmon polaritons excited by the electromagnetic radiation.

3. The method according to claim 1, wherein the step of supplying a carrier substrate further comprises the substeps of:
   forming the first structure in the first region of the carrier substrate, wherein the carrier substrate has dielectric material, and wherein the carrier substrate has an emboss layer having the first structure; and/or
   arranging the at least one metal layer on the face of the carrier substrate; wherein the metal layer has a layer thickness of 20 nm to 100 nm and/or at least one of the materials Al, Ag, Cu or Cr.

4. The method according to claim 1, wherein the first surface structure has an aspect ratio of smaller than 0.3.

5. The method according to claim 1, wherein the first structure has a one-dimensionally periodic structure, or the first structure has a two-dimensionally periodic structure, and/or
   the first structure has a period in the range of 350 nm to 2 μm.

6. The method according to claim 1, wherein the first structure has substantially a rectangular or sinusoidal profile as a periodic structure.

7. The method according to claim 1, wherein the second structure of the at least one second region has a relief structure or a relief-free structure, with the second structure having a diffractive or refractive structure as a relief structure.

8. The method according to claim 1, comprising:
   stipulating the geometric parameters of the first structure, on the basis of a pre-specified electromagnetic radiation, of a pre-specified angle of incidence and the formula $k_{SP}=k_{Photon} \sin \Theta_0 \pm n_V G$, with $G=2\pi/d$, where $k_{SP}$ is a wave vector of the surface plasmon polaritons, $k_{Photon}$ a wave vector of the photon incident on the metal layer, $\Theta_0$ the angle of incidence of the electromagnetic radiation impinging on the metal layer, $n_V$ an integral multiple, G a reciprocal grating vector, and d a period of the first structure; and/or
   irradiating the metal layer with electromagnetic radiation, there existing between the wavelength or the wavelengths λ and the period d of the first structure the following relation $\lambda \approx d*n$, where n is a refractive index of the carrier substrate or dielectric at the interface to the metal layer; and/or
   irradiating the metal layer with electromagnetic radiation from a wavelength range of 400 nm to 2000 nm.

9. The method according to claim 1, comprising:
   irradiating the metal layer with a beam of electromagnetic radiation which impinges on the metal layer at an angle of incidence of greater than 0° to 10°, based on a normal to a plane spanned by the first structure; and/or irradiating the metal layer with the beam of electromagnetic radiation, having a beam divergence with a divergence angle of smaller than 5° in the direction of a plane of incidence; and/or irradiating the metal layer with the beam of electromagnetic radiation, having a beam divergence with a divergence angle of smaller than 5°.

10. The method according to claim 1, comprising:
irradiating the metal layer by means of pulsed electromagnetic radiation, with the pulsed electromagnetic radiation having a pulse length of 10-200 nsec; and/or polarizing the beam of electromagnetic radiation, so that the metal layer is irradiated with TM-polarized radiation; and/or irradiating the metal layer with laser radiation as electromagnetic radiation with a top-hat-shaped beam cross section.

11. The method according to claim 1, comprising:
focusing the beam of electromagnetic radiation, so that the electromagnetic radiation is present so as to be focused in a focal plane that lies parallel to a plane spanned by the first structure; and/or deflecting the beam of electromagnetic radiation in order to guide the electromagnetic radiation over a region that is greater than the beam cross section, so that an irradiation by means of electromagnetic radiation can be effected at every point of a region to be irradiated; and/or transporting the layer element by means of a transport device, so that the layer element is guided into an irradiation zone, and guided out of the irradiation zone after the removing step.

12. A layer element, comprising
a carrier substrate with a face having at least one first and one second region, wherein
the first region has a first structure which is different from a second structure of the second region,
the first structure has an aspect ratio of smaller than 0.3, and
at least one metal layer arranged on the face of the carrier substrate,
wherein the metal layer is removable from the face of the carrier substrate in the first region with the first structure by excitation of surface plasmon polaritons by means of electromagnetic radiation;
wherein the metal layer in the second region is not removable by the excitation of surface plasmon polaritons that contribute to the removing of the metal layer in the first region on account of the first structure.

13. The layer element according to claim 12, wherein the first structure has a relief structure with a one-dimensionally periodic structure or a two-dimensionally periodic structure.

14. The layer element according to claim 12, wherein the first structure has a period in the range of 350 nm to 2 μm; and the first structure has substantially a rectangular or sinusoidal profile as a periodic structure.

15. The layer element according to claim 12, wherein the second structure of the at least one second region has a relief structure or a relief-free structure, with the second structure having a diffractive or refractive structure as a relief structure.

16. The layer element according to claim 12, wherein the carrier substrate has dielectric material, and wherein the carrier substrate has an emboss layer having the structures; and/or
the metal layer has a layer thickness of 20 nm to 100 nm; and/or
the metal layer has at least one of the materials Al, Ag, Cu or Cr.

17. A security element based on a layer element according to claim 12, wherein the layer element has at least one first and one second region and a partially arranged metal layer, wherein the metal layer is removed from the face of the carrier substrate in the first region with the first structure on account of the first structure of the first region and by excitation of surface plasmon polaritons.

18. A value document comprising a value-document substrate and at least one security element according to claim 17.

19. An apparatus for partially demetallizing a layer element, comprising:
a laser device for irradiating a layer element with laser radiation in an irradiation zone; and
a transport device for transporting the layer element,
wherein the layer element comprises a carrier substrate with a face that has at least one first and one second region, wherein the first region has a first structure which is different from
the second structure of the second region, and at least one metal layer arranged on the face of the carrier substrate; and
wherein the laser device is designed to excite, in the irradiation zone, surface plasmon polaritons on the metal layer of the layer element, so that the metal layer is removed in the first region having the first structure;
wherein the geometric parameters of the first structure are stipulated on the basis of a pre-specified electromagnetic radiation, of a pre-specified angle of incidence and the formula $k_{SP}=k_{Photon}\sin\Theta_0 \pm n_V G$, with $G=2\pi/d$, where $k_{SP}$ is a wave vector of the surface plasmon polaritons, $k_{Photon}$ a wave vector of the photon incident on the metal layer, $\Theta_0$ the angle of incidence of the electromagnetic radiation impinging on the metal layer, $n_V$ an integral multiple, G a reciprocal grating vector, and d a period of the first structure; and/or
the metal layer is irradiated with electromagnetic radiation, there existing between the wavelength or the wavelengths λ and the period d of the first structure the following relation $\lambda \approx d*n$, where n is a refractive index of the carrier substrate or dielectric at the interface to the metal layer; and/or
the metal layer is irradiated with electromagnetic radiation from a wavelength range of 400 nm to 2000 nm.

* * * * *